US012363381B2

(12) United States Patent
Kurzynski et al.

(10) Patent No.: US 12,363,381 B2
(45) Date of Patent: Jul. 15, 2025

(54) METHODS AND APPARATUS TO DETERMINE AUDIENCE SIZE BASED ON BIG DATA

(71) Applicant: The Nielsen Company (US), LLC, New York, NY (US)

(72) Inventors: David J. Kurzynski, South Elgin, IL (US); William Morris Harvey, Gardiner, NY (US); Martin Richard Frankel, Jupiter, FL (US); Yong Flannagan, Tampa, FL (US); Cermet Ream, St. Petersburg, FL (US); Meghan LePage Beeman, Franklin, TN (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/944,013

(22) Filed: Sep. 13, 2022

(65) Prior Publication Data
US 2023/0078684 A1   Mar. 16, 2023

Related U.S. Application Data

(60) Provisional application No. 63/244,068, filed on Sep. 14, 2021.

(51) Int. Cl.
*H04N 21/45*     (2011.01)
*H04N 21/466*    (2011.01)

(52) U.S. Cl.
CPC ..... *H04N 21/4516* (2013.01); *H04N 21/4524* (2013.01); *H04N 21/4532* (2013.01); *H04N 21/4667* (2013.01)

(58) Field of Classification Search
None
See application file for complete search history.

(56) References Cited

U.S. PATENT DOCUMENTS 4,258,386 A   3/1981   Cheung
4,546,382 A   10/1985  McKenna et al.
(Continued)

OTHER PUBLICATIONS

Yeager et al., "Comparing the Accuracy of RDD Telephone Surveys and Internet Surveys Conducted with Probability and Non-Probability Samples," dated Aug. 2009, accessed from https://www.researchgate.net/publication/237252858, 42 pages.
(Continued)

*Primary Examiner* — Junior O Mendoza
*Assistant Examiner* — Charles N Hicks

(57) ABSTRACT

Methods, apparatus, systems, and articles of manufacture are disclosed to optimize projection of big data beyond its footprint. An example apparatus includes memory, instructions, and processor circuitry to access panel audience sizes corresponding to subscribers of a media provider, a subset of the subscribers of the media provider, and corresponding to a media network determine a relative percent difference between the third panel audience size and the fourth panel audience size, when the relative percent absolute difference satisfies a first threshold, determine percentages of demographic groups represented in the panel audience sizes, determine differences associated with the demographic groups, and when at least one of the differences corresponding to at least one of the demographic groups satisfies a second threshold, determine the subscribers, the subset of the subscribers, and the at least one of the demographic groups as useable to determine an audience size of the media network.

11 Claims, 13 Drawing Sheets

(56) References Cited

U.S. PATENT DOCUMENTS

| | | | |
|---|---|---|---|
| 4,602,279 A | 7/1986 | Freeman | |
| 4,745,549 A | 5/1988 | Hashimoto | |
| 4,930,011 A | 5/1990 | Kiewit | |
| 5,251,324 A | 10/1993 | McMullan, Jr. | |
| 5,374,951 A | 12/1994 | Welsh | |
| 5,550,928 A | 8/1996 | Lu et al. | |
| 5,600,364 A | 2/1997 | Hendricks et al. | |
| 5,608,445 A | 3/1997 | Mischler | |
| 5,798,785 A | 8/1998 | Hendricks et al. | |
| 5,801,747 A | 9/1998 | Bedard | |
| 5,841,433 A | 11/1998 | Chaney | |
| 5,848,396 A | 12/1998 | Gerace | |
| 5,857,190 A | 1/1999 | Brown | |
| 5,872,588 A | 2/1999 | Aras et al. | |
| 5,948,061 A | 9/1999 | Merriman et al. | |
| 5,977,964 A | 11/1999 | Williams et al. | |
| 5,991,735 A | 11/1999 | Gerace | |
| 6,005,597 A | 12/1999 | Barrett et al. | |
| 6,049,695 A | 4/2000 | Cottam | |
| 6,067,440 A | 5/2000 | Diefes | |
| 6,088,722 A | 7/2000 | Herz et al. | |
| 6,112,186 A | 8/2000 | Bergh et al. | |
| 6,119,098 A | 9/2000 | Guyot et al. | |
| 6,298,348 B1 | 10/2001 | Eldering | |
| 6,446,261 B1 | 9/2002 | Rosser | |
| 6,463,585 B1 | 10/2002 | Hendricks et al. | |
| 6,530,082 B1 | 3/2003 | Del Sesto et al. | |
| 6,684,194 B1 | 1/2004 | Eldering et al. | |
| 6,714,917 B1 | 3/2004 | Eldering et al. | |
| 7,047,550 B1 | 5/2006 | Yasukawa et al. | |
| 7,050,990 B1 | 5/2006 | Chu et al. | |
| 7,051,352 B1 | 5/2006 | Schaffer | |
| 7,062,510 B1 | 6/2006 | Eldering | |
| 7,117,518 B1 | 10/2006 | Takahashi et al. | |
| 7,139,723 B2 | 11/2006 | Conkwright et al. | |
| 7,146,329 B2 | 12/2006 | Conkwright et al. | |
| 7,150,030 B1 | 12/2006 | Eldering et al. | |
| 7,168,084 B1 | 1/2007 | Hendricks et al. | |
| 7,197,472 B2 | 3/2007 | Conkwright et al. | |
| 7,231,652 B2 | 6/2007 | Gutta et al. | |
| 7,260,823 B2 | 8/2007 | Schlack et al. | |
| 7,376,722 B1 | 5/2008 | Sim et al. | |
| 7,383,243 B2 | 6/2008 | Conkwright et al. | |
| 7,844,985 B2 | 11/2010 | Hendricks et al. | |
| 7,937,725 B1 | 5/2011 | Schaffer et al. | |
| 7,962,935 B2 | 6/2011 | Kurosaki et al. | |
| 8,001,561 B2 | 8/2011 | Gibbs et al. | |
| 8,250,605 B2 | 8/2012 | Opaluch | |
| 8,327,395 B2 | 12/2012 | Lee et al. | |
| 8,365,213 B1 | 1/2013 | Orlowski | |
| 8,392,946 B2 | 3/2013 | Hnyk et al. | |
| 8,543,454 B2 | 9/2013 | Fleischman et al. | |
| 8,745,647 B1 | 6/2014 | Shin et al. | |
| 8,874,652 B1 | 10/2014 | Pecjak et al. | |
| 8,908,699 B2 | 12/2014 | Karaoguz et al. | |
| 9,344,509 B1 | 5/2016 | Serboncini et al. | |
| 9,420,320 B2 | 8/2016 | Doe | |
| 9,578,361 B2 | 2/2017 | Doe | |
| 9,900,655 B2 | 2/2018 | Doe | |
| 10,356,485 B2 | 7/2019 | Sullivan et al. | |
| 10,368,130 B2 | 7/2019 | Nagaraja Rao et al. | |
| 10,560,740 B2 | 2/2020 | Doe | |
| 11,089,361 B2 | 8/2021 | Doe | |
| 11,308,514 B2 | 4/2022 | Sheppard et al. | |
| 11,496,799 B2 | 11/2022 | Doe | |
| 2001/0049620 A1 | 12/2001 | Blasko | |
| 2002/0056087 A1 | 5/2002 | Berezowski et al. | |
| 2002/0058087 A1 | 5/2002 | Henson et al. | |
| 2002/0095676 A1 | 7/2002 | Knee et al. | |
| 2002/0104083 A1 | 8/2002 | Hendricks et al. | |
| 2002/0174428 A1 | 11/2002 | Agnihotri et al. | |
| 2003/0018969 A1 | 1/2003 | Humpleman et al. | |
| 2003/0020744 A1 | 1/2003 | Ellis et al. | |
| 2003/0051240 A1 | 3/2003 | Schaffer et al. | |
| 2003/0093530 A1 | 5/2003 | Syed | |
| 2004/0226034 A1 | 11/2004 | Kaczowka et al. | |
| 2005/0149946 A1 | 7/2005 | Evans | |
| 2005/0149964 A1 | 7/2005 | Thomas et al. | |
| 2005/0193411 A1 | 9/2005 | Funston | |
| 2006/0020973 A1 | 1/2006 | Hannum et al. | |
| 2006/0026642 A1 | 2/2006 | Schaffer et al. | |
| 2006/0074769 A1 | 4/2006 | Looney et al. | |
| 2006/0075421 A1 | 4/2006 | Roberts et al. | |
| 2006/0174277 A1 | 8/2006 | Sezan et al. | |
| 2007/0011039 A1 | 1/2007 | Oddo | |
| 2007/0022032 A1 | 1/2007 | Anderson et al. | |
| 2007/0136753 A1 | 6/2007 | Bovenschulte et al. | |
| 2007/0138753 A1 | 6/2007 | Huang | |
| 2007/0143775 A1 | 6/2007 | Savoor et al. | |
| 2007/0204287 A1 | 8/2007 | Conradt et al. | |
| 2007/0240180 A1 | 10/2007 | Shanks et al. | |
| 2007/0250856 A1 | 10/2007 | Leavens et al. | |
| 2008/0140479 A1 | 6/2008 | Mello et al. | |
| 2008/0167943 A1 | 7/2008 | O'Neil et al. | |
| 2008/0172781 A1 | 7/2008 | Popowich et al. | |
| 2008/0249834 A1 | 10/2008 | Zigmond et al. | |
| 2008/0271078 A1 | 10/2008 | Gossweiler et al. | |
| 2008/0300965 A1 | 12/2008 | Doe | |
| 2009/0030780 A1 | 1/2009 | York et al. | |
| 2009/0113480 A1 | 4/2009 | Allard et al. | |
| 2009/0150917 A1 | 6/2009 | Huffman et al. | |
| 2009/0178081 A1 | 7/2009 | Goldenberg et al. | |
| 2009/0292587 A1 | 11/2009 | Fitzgerald | |
| 2010/0037253 A1 | 2/2010 | Sheehan et al. | |
| 2010/0169927 A1 | 7/2010 | Yamaoka et al. | |
| 2010/0211439 A1 | 8/2010 | Marci et al. | |
| 2011/0004682 A1 | 1/2011 | Honnold et al. | |
| 2011/0279311 A1 | 11/2011 | Hamano | |
| 2012/0151079 A1 | 6/2012 | Besehanic et al. | |
| 2012/0158527 A1 | 6/2012 | Cannelongo et al. | |
| 2012/0159528 A1 | 6/2012 | Toney, Jr. | |
| 2012/0192214 A1 | 7/2012 | Hunn et al. | |
| 2012/0215903 A1 | 8/2012 | Fleischman et al. | |
| 2012/0254911 A1 | 10/2012 | Doe | |
| 2012/0303834 A1 | 11/2012 | Adam et al. | |
| 2014/0053225 A1* | 2/2014 | Shoykher | H04L 51/52 725/132 |
| 2014/0108130 A1* | 4/2014 | Vos | G06Q 30/0246 705/14.45 |
| 2017/0150217 A1 | 5/2017 | Doe | |
| 2017/0180798 A1 | 6/2017 | Goli et al. | |
| 2018/0152760 A1* | 5/2018 | Venetucci | H04N 21/44222 |
| 2018/0167675 A1 | 6/2018 | Doe | |
| 2020/0226465 A1 | 7/2020 | Harrington et al. | |
| 2021/0133773 A1 | 5/2021 | Sheppard et al. | |
| 2021/0158377 A1 | 5/2021 | Sheppard et al. | |
| 2022/0070530 A1 | 3/2022 | Doe | |
| 2023/0078684 A1 | 3/2023 | Kurzynski et al. | |

OTHER PUBLICATIONS

Disogra et al., "Calibrating Non-Probability Internet Samples with Probability Samples Using Early Adopter Characteristics," dated Jan. 2011, accessed from http://www.asasrms.org/Proceedings/y2011/Files/302704_68925.pdf, 15 pages.

Arbitron Inc., Respondent-Level Data: Your Key to Reaching the Hispanic Listener, retrieved from <http://arbitronratings.com/adagencies/rldvs_hispsumm.htm?inframe>, retrieved on Sep. 21, 2007, 2 pages.

Arbitron Inc., Smartplus 8.0: Keeps Getting Smarter So You Can Too, 2007, 13 pages.

Bell et al., "The Effect of Sampling Error on the Time Series Behavior of Consumption Data," Journal of Econometrics 55 (1993) 235-265, 31 pages.

Consoli, John, http://www.mediaweek.com, Nielsen Unveils NationalTV/Internet Fusion, internet article, Nov. 1, 2006, 2 pages.

Gilula et al., A Direct Approach to Data Fusion, Journal of Marketing Research, vol. 43, Feb. 2006, 22 pages.

International Searching Authority, International Search Report, for International application No. PCT/US2008/059874, Mar. 2, 2009, 3 pages.

(56) References Cited

OTHER PUBLICATIONS

International Searching Authority, Written Opinion, for International application No. PCT/US2008/059874, Mar. 2, 2009, 5 pages.
Kugel et al., "Decay Effects in Online Advertising: Quantifying the Impact of Time Since Last Exposure," Presented at the ARF 50th Annual Convention, New York City, Apr. 26-28, 2004, 19 pages.
Philip Morris, "Teenage Attitudes and Behavior Study Methodology 2006", 9 pages.
Scott, Stuart, "On the Impact of Sampling Error on Modeling Seasonal Time Series," Bureau of Labor Statistics Publications, Office of Survey Methods Research, Oct. 2009, accessed from https://www.bls.goviosmr/researchpapers/2009/pdfist090230.pdf, 15 pages.
United States Patent and Trademark Office, "Final Office Action," issued in connection with U.S. Appl. No. 13/078,574, filed May 29, 2013, 16 pages.
United States Patent and Trademark Office, "Final Office Action," mailed in connection with the U.S. Appl. No. 15/891,076, on Mar. 6, 2019 , 24 pages.
United States Patent and Trademark Office, "Non-Final Office Action," issued in connection with U.S. Appl. No. 13/078,574, filed Dec. 13, 2012, 17 pages.
United States Patent and Trademark Office, "Non-final Office Action," mailed in connection with the U.S. Appl. No. 15/891,076, on Sep. 17, 2018, 29 pages.
United States Patent and Trademark Office, "Non-final Office Action," issued in connection with U.S. Appl. No. 12/100,953, filed Mar. 18, 2011, 15 pages.

\* cited by examiner

400 ⇢

| | 402 PROJECTOR | 404 PROJECTEE |
|---|---|---|
| 406 | PROVIDER 1 RPD 202 | TOTAL PROVIDER 1 FOOTPRINT 200 |
| 408 | PROVIDER 2 RPD | TOTAL PROVIDER 2 FOOTPRINT |
| 410 | PROVIDER 1 RPD AND PROVIDER 2 RPD | TOTAL CABLEPLUS FOOTPRINT |
| 412 | PROVIDER 3 ACR | TOTAL PROVIDER 3 FOOTPRINT |
| 414 | PROVIDER 4 ACR | TOTAL PROVIDER 4 FOOTPRINT |
| 416 | PROVIDER 3 ACR AND PROVIDER 4 ACR | TOTAL SMART TV FOOTPRINT |
| 418 | PROVIDER 3 ACR AND PROVIDER 4 ACR | TOTAL CONNECTED TV FOOTPRINT |
| 420 | PROVIDER 3 AND PROVIDER 4 OTA OR BBO | TOTAL OTA OR BBO |
| 422 | PROVIDER 3 AND PROVIDER 4 OTA | TOTAL OTA |
| 424 | PROVIDER 3 AND PROVIDER 4 BBO | TOTAL BBO |
| 426 | PROVIDER 3 AND PROVIDER 4 THAT IS CALBLEPLUS BUT NOT PROVIDER 1 RPD AND PROVIDER 2 RPD | TOTAL CABLEPLUS HOMES THAT ARE NOT PROVIDER 1 RPD AND PROVIDER 2 RPD |
| 428 | PROVIDER 3 AND PROVIDER 4 THAT IS CABLE PLUS EXCL PROVIDER 1 AND PROVIDER 2 | TOTAL CABLEPLUS HOMES THAT ARE NOT PROVIDER 1 AND PROVIDER 2 |
| 430 | PROVIDER 3 ACR AND PROVIDER 4 ACR WITH CABLEPLUS | TOTAL CABLEPLUS = CABLE OR SATELLITE |
| 432 | PROVIDER 3 ACR AND PROVIDER 4 ACR EXCLUDING PROVIDER 1 RPD AND PROVIDER 2 RPD | TOTAL SMART TV EXCL PROVIDER 1 RPD AND PROVIDER 2 RPD |
| 434 | PROVIDER 1 RPD, PROVIDER 2 RPD, PROVIDER 3 ACR, AND PROVIDER 4 ACR | CABLEPLUS OR CTV |

FIG. 4

| MARKET BREAK | AVG UE DISTRIBUTION: SUBSET OF SUBSCRIBERS OF PROVIDER 1 202 | AVG UE DISTRIBUTION: SUBSCRIBERS OF PROVIDER 1 200 | DIFFERENCE |
|---|---|---|---|
| COMPOSITE | 31372 | 68807 | -37435 |
| HOH AGE < 35 | 26% | 23% | 3% |
| HOH AGE 35-54 | 41% | 41% | 0% |
| HOH AGE 55+ | 33% | 37% | -4% |
| HISPANIC NON-WHITE | 6% | 7% | -1% |
| NON-HISPANIC NON-WHITE | 23% | 22% | 1% |
| HISPANIC WHITE | 10% | 10% | 0% |
| NON-HISPANIC WHITE | 61% | 62% | -1% |
| HHLD INCOME < $50K | 34% | 30% | 4% |
| HHLD INCOME $50K-100K | 37% | 37% | 0% |
| HHLD INCOME $100,000+ | 29% | 34% | -5% |
| TERRITORY- EASTCENTRAL | 12% | 11% | 1% |
| TERRITORY- NORTHEAST | 18% | 20% | -2% |
| TERRITORY- PACIFIC | 18% | 20% | -2% |
| TERRITORY- SOUTHEAST | 23% | 21% | 2% |
| TERRITORY- SOUTHWEST | 14% | 13% | 1% |
| TERRITORY- WEST CENTRAL | 15% | 14% | 1% |
| COUNTY SIZE = A & B | 71% | 75% | -4% |
| COUNTY SIZE = C & D | 29% | 25% | 4% |
| HHLD SIZE = 1 & 2 | 45% | 50% | -5% |
| HHLD SIZE = 3 | 19% | 19% | 1% |
| HHLD SIZE = 4+ | 35% | 31% | 4% |
| HHLD W/ CHILDREN | 42% | 38% | 4% |
| HHLD W/ NO CHILDREN | 58% | 62% | -4% |
| HISPANIC | 17% | 17% | 0% |
| NON-HISPANIC | 83% | 83% | 0% |
| ASIAN* | 5% | 7% | -2% |
| BLACK* | 18% | 14% | 4% |
| RACE -- OTHER* | 12% | 14% | -2% |
| WHITE* | 71% | 72% | -1% |

FIG. 6

METHODS AND APPARATUS TO DETERMINE AUDIENCE SIZE BASED ON BIG DATA

RELATED APPLICATION

This patent claims the benefit of U.S. Provisional Patent Application No. 63/244,068 which was filed on Sep. 14, 2021. U.S. Provisional Patent Application No. 63/244,068 is hereby incorporated herein by reference in its entirety. Priority to U.S. Provisional Patent Application No. 63/244,068 is hereby claimed.

FIELD OF THE DISCLOSURE

This disclosure relates generally to computer-generated audience metrics and, more particularly, to methods and apparatus to determine audience size based on big data.

BACKGROUND

Many households access media through set top boxes (STBs) provided by media providers (e.g., cable media providers, satellite media providers, etc.). Some STBs are equipped to report tuning data, which is indicative of the media accessed by the STBs, back to the media providers. Tuning data reported back to media providers via STBs is sometimes referred to as return path data (RPD). Additionally, some households access media provided by Smart televisions (TVs). Some Smart TVs are equipped with automatic content recognition (ACR) software to report streaming data back to the media providers. Streaming data reported back to media providers via Smart TVs is sometimes referred to as ACR data. RPD and ACR data may be used by audience measurement entities to estimate audience metrics.

BRIEF DESCRIPTION OF THE DRAWINGS

FIG. 4 illustrates example projection cohorts that can be implemented in examples disclosed herein.

FIG. 6 illustrates an example stratification table that can be used to determine a stratification group in examples disclosed herein.

Figure 1:
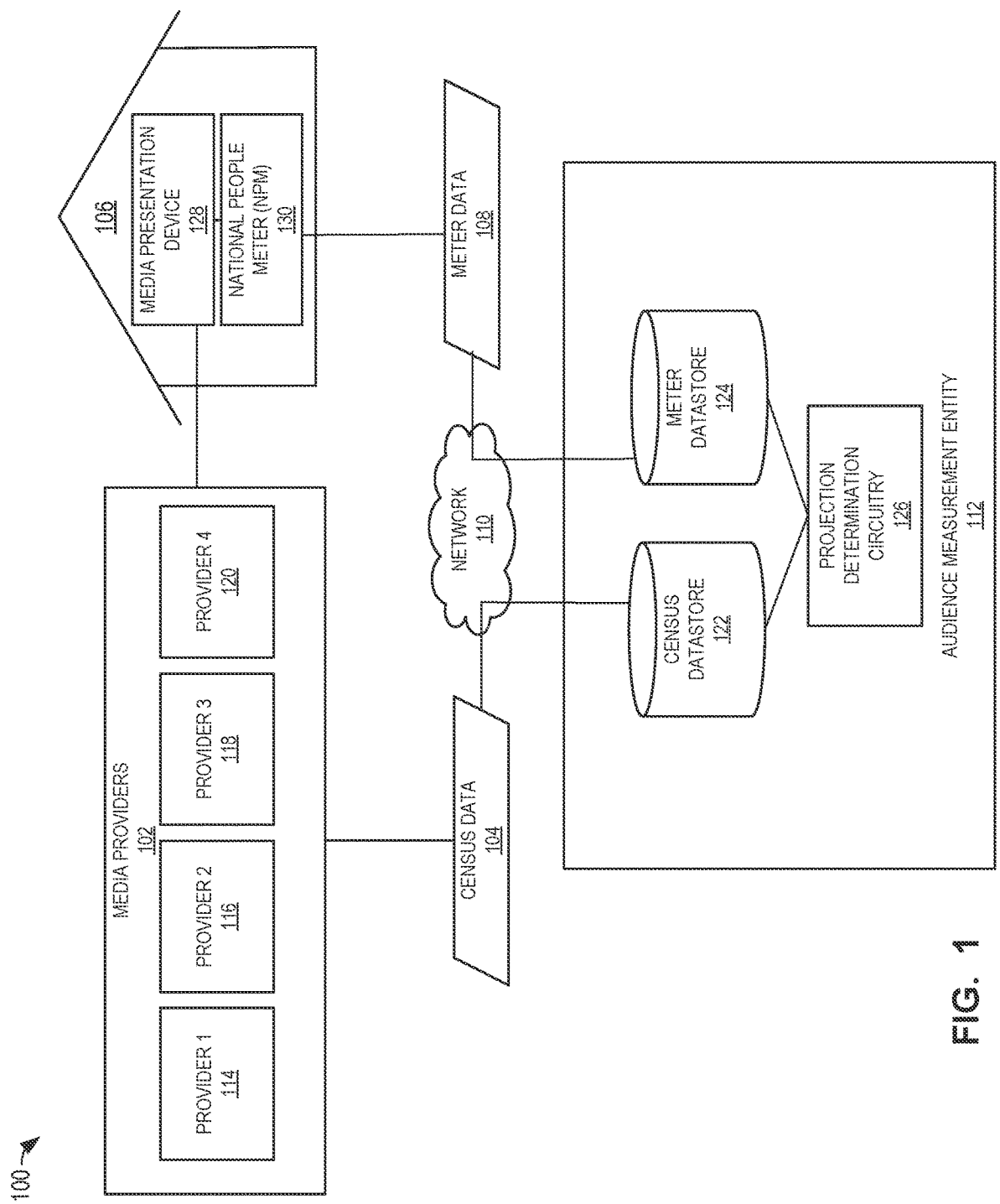
FIG. 1 illustrates an example environment in which example census data and example meter data are collected to determine projection cohorts using examples disclosed herein.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Typically, national ratings are generated based on audience measurement data collected via people meters installed in statistically selected panelist households. The people meters monitor the exposure of panelists to media and automatically report such data to an audience measurement entity (AME) for subsequent analysis and processing. Additionally or alternatively, some AMEs rely on panelists in smaller local market areas to record their media consumption behavior in paper diaries over specified periods of time and then mail the completed diaries to the AME for subsequent analysis and processing. While paper diaries provide a relatively inexpensive method to increase the audience measurement sample size, what panelists record in the paper diaries may not always be accurate, thereby introducing potential biases in the data.

As technology has advanced, AMEs have turned to tuning data collected, measured, and/or reported from RPD devices and/or ACR devices as alternate sources of data that may be used to generate ratings for media and/or other audience metrics. As used herein, census data refers to tuning data received from RPD devices and/or ACR devices. For example, census data is collected (e.g., by a meter, a server, or any other electronic device or computer) to represent media accesses by users whose demographic information is unknown. As such, census data can be indicative of media accesses by users but not indicative of the specific audience members to which the accesses should be attributed. An AME typically logs census data as anonymous accesses to media. Accordingly, census data is not directly indicative of total unique audience sizes because multiple census-level media accesses may be attributed to the same person. As such, because census data is anonymous, it is not readily apparent from collected census data whether multiple logged instances of accesses to the same media correspond to the same person or to different people.

As used herein, an RPD device refers to any type of media device (e.g., a set top box (STB) or other similar device) that is capable of accessing media from a media provider and reporting tuning data regarding the media accessed back to the media provider. Such tuning data is referred to herein as STB data, RPD tuning data or simply RPD. The STB data may include a household identification (e.g., a household ID) and/or a STB identification (e.g., a STB ID). Return path data includes any data receivable at a content provider from the return path from a content consumer site. As such, return path data includes set-top box data.

As streaming media becomes more prevalent, some monitoring technologies have been deployed to automatically detect streaming digital media content (e.g., television series, episodes, programs, films, online videos, etc.) being presented and/or watched. As used herein, media presentation includes media output by a media device. ACR uses fingerprinting (e.g., acoustic fingerprinting and/or video fingerprinting) and digital watermarking to identify media presented on a presentation device capable of streaming content (e.g., a smart TV, a streaming media player, mobile devices, and/or another ACR-enabled device). The presentation device can collect tuning data via ACR to understand viewing information and behaviors of panelists(s) and/or households(s) associated with the digital media content. The terms "ACR tuning data" and/or "ACR data" are used herein to describe data obtained using ACR that indicate viewing conditions related to the media, which may include geographic information of the presentation device.

Using RPD tuning data and/or ACR tuning data for audience metrics has the advantage that it is relatively inexpensive to obtain. Not only are RPD tuning data and ACR tuning data relatively inexpensive to collect with modern computer technology that makes the reporting of such data possible, RPD/ACR tuning data is also advantageous in that it may be collected from much larger quantities of households than possible through traditional audience measurement panels. For example, RPD tuning data may be collected from households that include an RPD device because the reporting of RPD tuning data can be configured by a provider (e.g., a cable television service provider, a satellite television service provider, an over-the-top (OTT) service provider, etc.) for such devices at the time of manufacture. In other examples, ACR tuning data may be collected from households that include an ACR-enabled device because the ACR software can be included in the ACR-enabled device by an ACR provider (e.g., Amazon Inc., LG Corporation, Roku, Inc., etc.).

While RPD and/or ACR tuning data provides advantages, there are challenges with relying exclusively, or even partially, on RPD and/or ACR tuning data for purposes of audience measurement. In some examples, a household can have an RPD device to report tuning data (e.g., the household subscribes to a cable provider), and the same household may have other media devices that are not capable of reporting RPD tuning data. Such devices can be Smart TVs and/or non-RPD devices. As a result, RPD tuning data collected in such households may not account for media accesses by audience members in non-RPD devices. In other examples, a household can have an ACR-enabled Smart TV to report tuning data (e.g., the household has a Samsung device that reports tuning data to the Samsung media service provider), and the same household may have other media devices that are not capable of reporting ACR tuning data. Such devices can be non-ACR enabled Smart TVs (e.g., Smart TVs that do not have a return path connection and/or functionality to implement ACR processes to recognize media and report media accesses to a media provider). As a result, ACR tuning data collected in such households may not account for media accesses by audience members using non-ACR enabled Smart TVs. Therefore, in some examples, RPD tuning data reported for a household and/or ACR tuning data reported for a household may not account for all media accesses in the household and, thus, may be biased or illogical. Furthermore, return path data may not include data related to the user viewing the media corresponding to the media presentation device. Accordingly, return path data may not be able to be associated with specific viewers, demographics, locations, etc.

Examples disclosed herein utilize panel data collected by an AME to overcome at least some of the limitations associated with determining audience metrics in local markets based on RPD tuning data and/or ACR tuning data. Examples disclosed herein compare panel audience sizes corresponding to subscribers of media providers to panel audience sizes corresponding to a subset of the subscribers of media providers having media access devices with RPD and/or ACR capabilities. In some examples disclosed herein, audience sizes associated with subscribers with return path capable (RPC) devices (e.g., RPD-enabled devices and/or ACR-enabled devices) can project onto audience sizes for all subscribers. In other examples disclosed herein, audience sizes associated with subscribers with certain return path devices can project onto audience sizes for certain groups that are larger than the projecting group but are not specifically all subscribers to any one cable provider, satellite provider, or TV set manufacturer. Examples disclosed herein identify the exact groups to project from and the exact groups to project to. As such, examples disclosed herein minimize bias in the RPD tuning data and/or the ACR tuning data.

As used herein, a panelist is a member of a panel of audience members that have agreed to have their accesses to media monitored. That is, an entity such as an AME enrolls people that consent to being monitored into a panel. During enrollment, the AME receives demographic information from the enrolling people so that subsequent correlations may be made between media accesses by those panelists and different demographic markets. Such correlations for accessed media may be logged as demographic impressions. As used herein, a demographic impression is defined to be an impression that is associated with a characteristic (e.g., demographic characteristic) of a person attributed with accessing the media. For example, the AME can generate a demographic impression by associating a panelist's demographic information with an impression for the media accessed at a client device associated with that panelist.

As used herein, an impression is defined to be an event in which a home and/or individual accesses or is exposed to media (e.g., an advertisement, content, a group of advertisements, and/or a collection of content). In Internetbased media delivery, a quantity of impressions or impression count is the total number of times media (e.g., content, an advertisement, or advertisement campaign) has been accessed by a population or audience members (e.g., the number of times the media is accessed). In some examples, an impression or media impression is logged by an impression collection entity (e.g., an AME or a media provider) in response to an impression reporting from a media device (e.g., a client device) that accessed the media. For example, an impression reporting may be a communication sent by a client device to an impression collection server via a return path to report the occurrence of a media impression at the media device. In some examples, a media impression is not associated with demographics. In non-Internet media delivery, such as TV media, a television or a device (e.g., a STB or other media monitoring device such as a meter) attached to a TV may monitor media being output by the TV. The monitoring generates a log of impressions associated with the media displayed on the TV. The TV and/or connected device (e.g., a meter) may transmit impression logs to the impression collection entity to log the media impressions.

As used herein, a unique audience is based on audience members distinguishable from one another. That is, a particular audience member exposed to particular media is measured as a single unique audience member regardless of how many times that audience member is exposed to that particular media or the particular platform(s) through which the audience member is exposed to the media. If that particular audience member is exposed multiple times to the same media, the multiple exposures for the particular audience member to the same media is counted as only a single unique audience member. As used herein, an audience size is a quantity of unique audience members of a particular activity (e.g., an audience that accessed particular media, an audience that accessed a particular media network at a particular time, etc.). That is, an audience size is a number of deduplicated or unique audience members that access a media item that is of interest for audience metrics analysis. A deduplicated or unique audience member is one that is counted only once as part of an audience size. Thus, regardless of whether a particular person is detected as accessing a media item once or multiple times, that person is only counted once as the audience size for that media item. In this manner, impression performance for particular media is not disproportionately represented when a small subset of one or more audience members accesses the same media a significantly large number of times while a larger number of audience members accesses that same media fewer times or not at all. Audience size may also be referred to as unique audience size, unique audience, or deduplicated audience. By tracking media accesses by unique audience members, a unique audience measure may be used to determine a reach measure to identify how many unique audience members are reached by media. In some examples, increasing unique audience and, thus, reach, is useful for advertisers wishing to reach a larger audience base.

FIG. 1 is an example environment 100 in which teachings disclosed herein may be implemented. FIG. 1 includes example media providers 102, example census data 104, an example panelist household 106, example meter data 108, an example network 110, and an example audience measurement entity 112. The example media providers 102 include example Provider 1 114, example Provider 2 116, example Provider 3 118, and example Provider 4 120. The example AME 112 includes an example census datastore 122, an example meter datastore 124, and example projection determination circuitry 126. The example panelist household 106 includes an example media presentation device 128 and an example national people meter (NPM) 130.

The example media providers 102 are service providers (e.g., cable media service providers, satellite media service providers, smart TV media service providers, etc.) that deliver media and/or media-related services (e.g., smart TV operating systems, graphical user interfaces, electronic programming guides (EPGs), interactive programming guides (IPGs), digital video recording (DVR) services, etc.) to subscribers. In the example of FIG. 1, the Provider 1 114 and the Provider 2 116 collect RPD tuning data indicative of media accessed by subscribers via RPD devices (e.g., Provider 1 114 is a cable provider and Provider 2 116 is a satellite provider). In some examples, RPD devices are provided by the Provider 1 114 and the Provider 2 116 when households initially become subscribers to enable access to media delivered by the Provider 1 114 and/or the Provider 2 116.

Additionally or alternatively, the example Provider 3 118 and the example Provider 4 120 collect ACR tuning data indicative of media accessed by subscribers via ACR-enabled media devices (e.g., Provider 3 118 and Provider 4 120 are smart TV providers). In some examples, ACR-enabled media devices are provided by the Provider 3 118 and/or the Provider 4 120 when households initially become subscribers to enable access to media delivered by the Provider 3 118 and/or the Provider 4 120. The example providers 102 may provide the census data 104 (e.g., RPD from Provider 1 114, RPD from Provider 2 116, ACR data from Provider 3 118, ACR data from Provider 4 120, etc.) to the AME 112. In some examples, "census data" can be referred to as "Big Data". In some examples, Big Data is collected and/or provided by media providers (e.g., the media providers 102). The example AME 112 can store the census data 104 in the example census datastore 122. In some examples, the providers 102 and the AME 112 communicate via the network 110 such as, for example, the Internet. The example network 110 may be implemented using any type of public or private network (LAN), a cable network, and/or a wireless network.

In some examples, there may be households that subscribe to at least one of the providers 102 but do not have equipment capable of reporting RPD tuning data or ACR data because, for example, such households use older equipment. In some examples, some households may opt out of providing (or not opt in to provide) RPD tuning data and/or ACR data. Further, some households may be subscribers to example Provider 1 114 with an RPD device that reports RPD tuning information to Provider 1 114, but example Provider 1 114 does not provide such information to the AME 112. Additionally or alternatively, some households may be subscribers to example Provider 3 118 with an ACR-enabled device that reports ACR data to Provider 3 118, but example Provider 3 118 does not provide such information to the AME 112. Therefore, the example census data 104 reported to the AME 112 in the example of FIG. 1 does not provide total audience metrics for the media providers 102. As such, the example census data 104 is incomplete to represent accesses to media by all households (e.g., all households in a surrounding region).

As shown in FIG. 1, the example environment 100 includes the example panelist household 106 to represent example households that have members enrolled as panelists with the AME 112. In some examples, panelists correspond to a statistically selected subset of all potential audience members representative of a whole population of interest. In some such panel-based monitoring systems, the panelists agree to provide detailed demographic information about themselves. In this manner, detailed media access metrics are generated based on collected media access data and associated user demographics, which can then be statistically extrapolated to an entire population of interest (e.g., a local market, a national market, a demographic segment, etc.).

While the RPD tuning data collected from the RPD devices and the ACR data collected from the ACR-enabled devices may be insufficient to fully account for all media accesses for any one of the households in a population of interest, the example AME 112 is at least able to achieve a relatively more complete measurement of media accessed at the panelist household 106. This is possible because the example panelist households 106 are provided with NPMs (e.g., the NPM 130) to track and/or monitor most or all media accessed via devices monitored by the NPMs in the households 106 and report collected media access monitoring data (e.g., the meter data 108) to the AME 112 (e.g., via the network 110). As used herein, the example meter data 108 refers to data collected by metering devices (e.g., the NPM 130) in example panelist households. The example AME 112 can store the meter data 108 in the meter datastore 124. While the single example metering device 130 is shown in the representative panelist household 106 to monitor the example media presentation device 128, multiple separate metering devices may be associated with additional media presentation devices in the example panelist household 106 to independently track and report media accessed by each device to the AME 112.

In the illustrated example of FIG. 1, the AME 112 includes the projection determination circuitry 126. The example projection determination circuitry 126 utilizes the example meter data 108 to determine a projection cohort and a stratification group for projection. As used herein, "stratification" refers to sorting audience members into distinct groups (e.g., subgroups) of characteristics (e.g., demographics) or behaviors. For example, audience members of a particular group (or subgroup) correspond the same characteristic or behavior represented by that group (or subgroup). In some examples, the projection determination circuitry 126 utilizes the census data 104 to determine a projection cohort and a stratification group for projection. However, for purposes of explanation, the projection determination circuitry 126 utilizes the meter data 108 to determine a projection cohort and a stratification group in examples disclosed herein. As used herein, a "projection cohort" includes a projectee and a projector, wherein the projectee denotes multiple subscribers (e.g., all subscribers) to a media provider and projector denotes a subset of the subscribers to the media provider. In examples disclosed herein, the projector (e.g., a projector group) includes an audience size of the subset (e.g., a return path capable subset) of the subscribers that use return path capable (RPC) devices only. In examples disclosed herein, RPC devices are media access devices and/or media presentation devices (e.g., client devices) that include RPD capabilities (e.g., RPD devices), ACR capabilities (e.g., ACR-enabled devices), and/or any other media access monitoring capabilities to report media access activities back to a media provider (e.g., the media providers 102 of FIG. 1). In examples disclosed herein, the projectee (e.g., a projectee group) includes an audience size of the subscribers that use RPC devices and subscribers that use non-RPC devices. Thus, in examples disclosed herein, the audience size representing the projector (e.g., the subset of the subscribers to the media provider) is smaller than the audience size representing the projectee. The example projection determination circuitry 126 determines percent differences between audience sizes of multiple projectee groups and audience sizes of multiple projector groups to determine a viable projection cohort, as described in detail below in connection with FIGS. 5-8.

Figure 2:
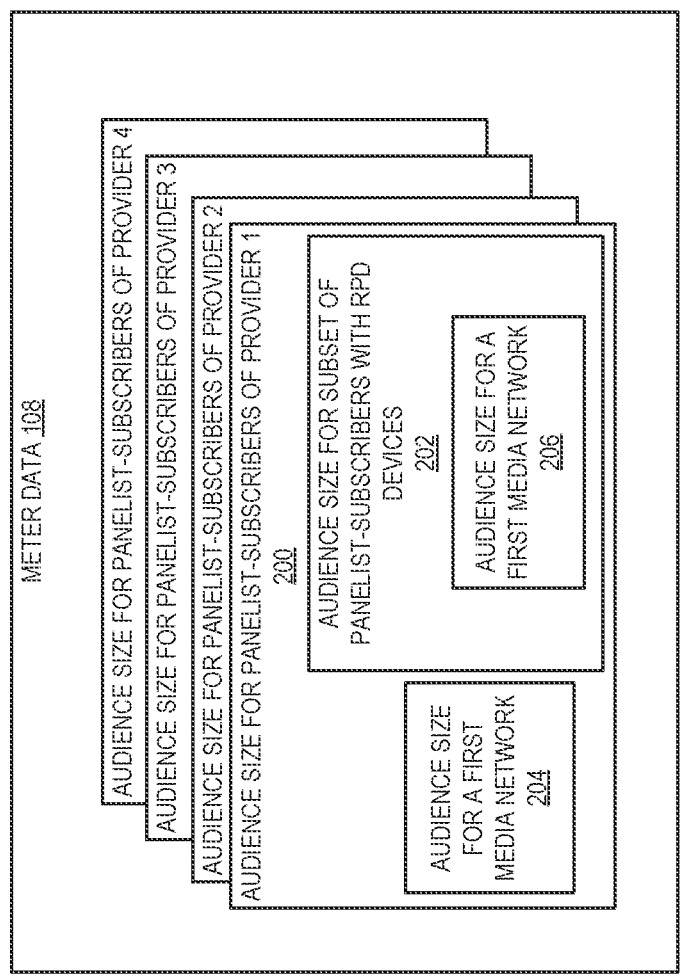
FIG. 2 is a block diagram of the example meter data of FIG. 1.

FIG. 2 is a block diagram of the example meter data 108 of FIG. 1. The example meter data 108 includes panel audience sizes corresponding to each of the media providers 102. In the example of FIG. 2, Provider 1 114 and Provider 2 116 are cable providers and Provider 3 118 and Provider 4 120 are Smart TV providers. The example meter data 108 for Provider 1 114 includes a panel audience size of panelist-subscribers of Provider 1 114 (e.g., audience size 200) and a panel audience size of a RPD subset of the panelist-subscribers of Provider 1 114 (e.g., audience size 202). The panelist-subscribers of Provider 1 114 include both panelist-subscribers that use RPD devices and panelist-subscribers that use non-RPD devices, and the RPD subset of the panelist-subscribers of Provider 1 114 corresponds to ones of the panelist-subscribers of Provider 1 114 that use RPD devices only.

Further, the audience size 200 includes an audience size of a first media network (e.g., audience size 204). In this example, the audience size 204 represents first network subscribers of Provider 1 114 that access a first media network via RPD devices and non-RPD devices. Alternatively, the audience size 202 includes an audience size of a first media network (e.g., audience size 206). In this example, the audience size 206 represents ones of the subscribers from the subset of the panelist-subscribers of Provider 1 114 (e.g., corresponding to the audience size 202 of FIG. 2) that access the first network via RPD devices only.

In some examples, the first media network can be any suitable media network (e.g., National Broadcasting Company (NBC), American Broadcasting Company (ABC), FOX Broadcasting Company, ESPN, etc.). In the example of FIG. 2, the audience sizes 204, 206 correspond to one media network (e.g., the first media network). However, the meter data 108 is data logged by the NPM 130 corresponding to any number of media networks. In some examples, the audience sizes 204, 206 can include an average audience size across multiple media networks. For purposes of explanation, the audience sizes 204, 206 represent the first media network (e.g., NBC). In some examples, the audience size for Provider 2 116, the audience size for Provider 3 118, and the audience size for Provider 4 120 include audience sizes according to the methods described in connection with Provider 1 114 described above.

Figure 3:
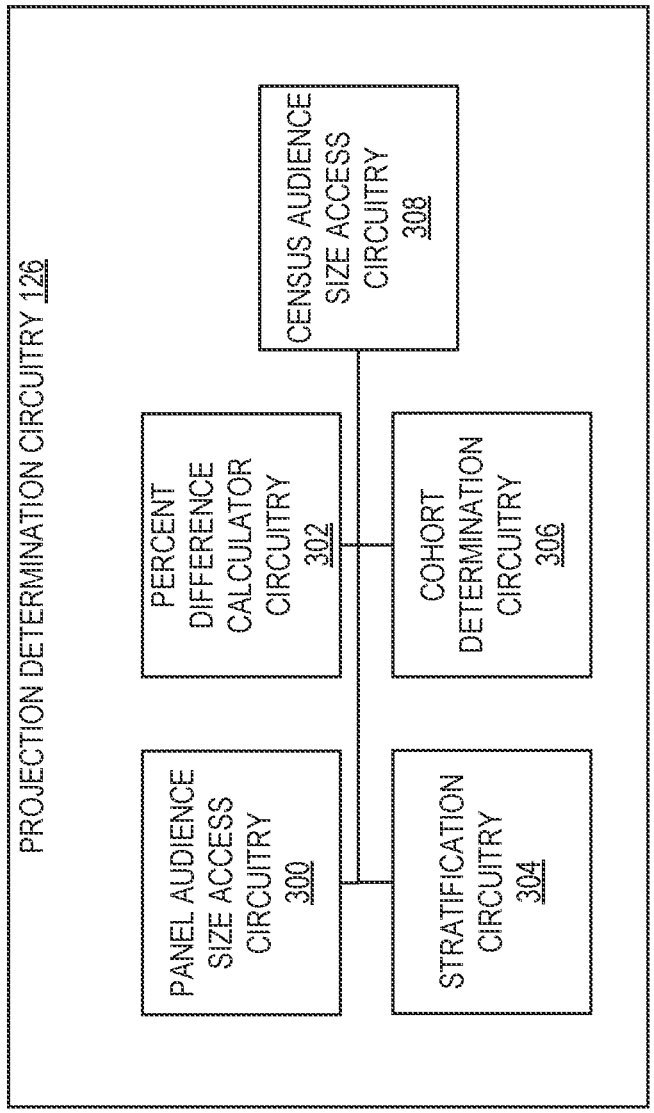
FIG. 3 is a block diagram of the example projection determination circuitry of FIG. 1.

FIG. 3 is a block diagram of the example projection determination circuitry 126 of FIG. 1 to determine a projection cohort and stratification group. The example projection determination circuitry 126 of FIG. 3 may be instantiated (e.g., creating an instance of, bring into being for any length of time, materialize, implement, etc.) by processor circuitry such as a central processing unit executing instructions. Additionally or alternatively, the example projection determination circuitry 126 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by microprocessor circuitry executing instructions to implement one or more virtual machines and/or containers.

In the illustrated example, the projection determination circuitry 126 of FIG. 3 includes example panel audience size access circuitry 300, example percent difference calculator circuitry 302, example stratification circuitry 304, example cohort determination circuitry 306, and example census audience size access circuitry 308. In some examples, the panel audience size access circuitry 300 accesses panel audience sizes. In some examples, the panel audience size access circuitry 300 accesses panel audience sizes from the meter data 108. In some examples, the panel audience size access circuitry 300 accesses a panel audience size corresponding to subscribers of a media provider (e.g., one of the media providers 102 of FIG. 1). For example, the panel audience size access circuitry 300 can access the audience size 200 (FIG. 2) of the panelist-subscribers of Provider 1 114 and an audience size 202 of a subset of the panelist-subscribers of Provider 1 114. Further, the panel audience size access circuitry 300 can access audience sizes for different media networks. For example, the panel audience size access circuitry 300 can access the audience size 204 of a first media network (e.g., NBC), wherein the audience size 204 represents panelist-subscribers of Provider 1 114 that access the first media network via RPD devices and non-RPD devices. Alternatively, the panel audience size access circuitry 300 can access the audience size 206 of the first media network, wherein the audience size 206 represents the subset of the panelist-subscribers of Provider 1 114 that access the first network via RPD devices only. In some examples, the panel audience size access circuitry 300 is instantiated by processor circuitry executing panel audience size access instructions and/or configured to perform operations such as those represented by the flowchart of FIG. 7.

In some examples, the projection determination circuitry 126 includes first means for accessing panel audience sizes. For example, the first means for accessing may be implemented by example panel audience size access circuitry 300. In some examples, the example panel audience size access circuitry 300 may be instantiated by processor circuitry such as the example processor circuitry 912 of FIG. 9. For instance, the example panel audience size access circuitry 300 may be instantiated by the example microprocessor 1000 of FIG. 10 executing machine executable instructions such as those implemented by at least blocks 702, 704, 706, 708 of FIG. 7. In some examples, the example panel audience size access circuitry 300 may be instantiated by hardware logic circuitry, which may be implemented by an ASIC, XPU, or the FPGA circuitry 1100 of FIG. 11 structured to perform operations corresponding to the machine readable instructions. Additionally or alternatively, the example panel audience size access circuitry 300 may be instantiated by any other combination of hardware, software, and/or firmware. For example, the example panel audience size access circuitry 300 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example percent difference calculator circuitry 302 determines (e.g., calculates) a percent difference between audience sizes. In some examples, an audience size can include a number of viewers of a media network. However, an audience size can also include ratings and/or share information. As used herein, audience share refers to a percentage of households or audience members actually watching TV at a certain time (e.g., prime time, full day, etc.). In some examples, the percent difference calculator circuitry 302 calculates a percent difference between the audience size 204 and the audience size 206, as described in connection with FIG. 5. In some examples, the percent difference calculator circuitry 302 is instantiated by processor circuitry executing percent difference calculator instructions and/or configured to perform operations such as those represented by the flowchart of FIG. 7.

In some examples, the projection determination circuitry 126 includes first means for determining a percent difference. For example, the first means for determining may be implemented by the example percent difference calculator circuitry 302. In some examples, the example percent difference calculator circuitry 302 may be instantiated by processor circuitry such as the example processor circuitry 912 of FIG. 9. For instance, the example percent difference calculator circuitry 302 may be instantiated by the example microprocessor 1000 of FIG. 10 executing machine executable instructions such as those implemented by at least blocks 710, 712 of FIG. 7. In some examples, the example percent difference calculator circuitry 302 may be instantiated by hardware logic circuitry, which may be implemented by an ASIC, XPU, or the FPGA circuitry 1100 of FIG. 11 structured to perform operations corresponding to the machine readable instructions. Additionally or alternatively, the example percent difference calculator circuitry 302 may be instantiated by any other combination of hardware, software, and/or firmware. For example, the example percent difference calculator circuitry 302 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example stratification circuitry 304 determines percentages of demographic groups represented in panel audience sizes. For example, the stratification circuitry 304 determines percentages of demographic groups in the audience size 200. For example, 41% of the audience size 200 can include audience members between the ages of 35 and 54. Additionally or alternatively, the stratification circuitry 304 determines percentages of demographic groups in the audience size 202. For example, 41% of the audience size 202 can include audience members between the ages of 35 and 54. The example stratification circuitry 304 determines a difference between the percentages of the demographic groups. For example, the stratification circuitry 304 determines a difference between the percentage of the audience size 200 that is between the ages of 35 and 54 and the percentage of the audience size 202 that is between the ages of 35 and 54 (e.g., 41%–41%=0%). In some examples, the stratification circuitry 304 determines an absolute difference between the difference. Further, the example stratification circuitry 304 can compare the difference (e.g., a percentage such as 0%, 1%, 2%, 11%, 15%, etc.) to a threshold. In some examples, the stratification circuitry 304 compares the difference to a threshold of 1%. In some examples, the stratification circuitry 304 determines that a difference between a first audience size of panelist-subscribers (e.g., the audience size 200) for a demographic group and a second audience size of a subset of the panelist-subscribers (e.g., the audience size 202) for the same demographic group satisfies the threshold when the difference is less than 1%. However, the stratification circuitry 304 determines that a difference between a panelist-subscriber audience size (e.g., the audience size 200) and a subset of the panelist-subscriber audience size (e.g., the audience size 202) of a demographic group exceeds the threshold when the difference is greater than 1%. In this example, the difference between the percentages of the audience size 202 and the audience size 200 for a demographic group including the ages of audience members between the ages of 35 and 54 satisfies the threshold. In some examples, the stratification circuitry 304 can determine percentages of the demographic groups represented in census audience sizes. As used herein, a census audience size refers to a quantity of unique audience members of a particular activity (e.g., an audience that accessed particular media, an audience that accessed a particular media network at a particular time, etc.) for non-panelist subscribers to an example media provider. In some examples, the stratification circuitry 304 is instantiated by processor circuitry executing stratification instructions and/or configured to perform operations such as those represented by the flowcharts of FIGS. 7 and 8.

In some examples, the projection determination circuitry 126 includes second means for determining a demographic group. For example, the second means for determining may be implemented by the example stratification circuitry 304. In some examples, the example stratification circuitry 304 may be instantiated by processor circuitry such as the example processor circuitry 912 of FIG. 9. For instance, the example stratification circuitry 304 may be instantiated by the example microprocessor 1000 of FIG. 10 executing machine executable instructions such as those implemented by at least blocks 714 of FIG. 7 and blocks 800, 802, 804, 806, 808. In some examples, the example stratification circuitry 304 may be instantiated by hardware logic circuitry, which may be implemented by an ASIC, XPU, or the FPGA circuitry 1100 of FIG. 11 structured to perform operations corresponding to the machine readable instructions. Additionally or alternatively, the example stratification circuitry 304 may be instantiated by any other combination of hardware, software, and/or firmware. For example, the example stratification circuitry 304 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example cohort determination circuitry 306 determines the panelist-subscribers (e.g., projectee), the subset of the panelist-subscribers (e.g., projector), and a demographic group (e.g., stratification group) combination. For example, the cohort determination circuitry 306 can determine that the panelist-subscribers of Provider 1 114, the subset of the panelist-subscribers of Provider 1 114, and a demographic group including audience members with a household income between $50,000 and $100,000 as a combination. In some examples, the cohort determination circuitry 306 can notify the AME 112 that the combination of the panelist-subscribers of Provider 1 114, the subset of the panelist-subscribers of Provider 1 114, and the demographic group including audience members with a household income between $50,000 and $100,000 is a projection group of interest. In some examples, the example cohort determination circuitry 306 is instantiated by processor circuitry executing cohort determination instructions and/or configured to perform operations such as those represented by the flowchart of FIG. 7.

In some examples, the projection determination circuitry 126 includes third means for determining the panelist-subscribers, the subset of the panelist-subscribers, and the one of the demographic groups as a combination for projection. For example, the third means for determining may be implemented by example cohort determination circuitry 306. In some examples, the example cohort determination circuitry 306 may be instantiated by processor circuitry such as the example processor circuitry 912 of FIG. 9. For instance, the example cohort determination circuitry 306 may be instantiated by the example microprocessor 1000 of FIG. 10 executing machine executable instructions such as those implemented by at least blocks 714 of FIG. 7. In some examples, the example cohort determination circuitry 306 may be instantiated by hardware logic circuitry, which may be implemented by an ASIC, XPU, or the FPGA circuitry 1100 of FIG. 11 structured to perform operations corresponding to the machine readable instructions. Additionally or alternatively, the example cohort determination circuitry 306 may be instantiated by any other combination of hardware, software, and/or firmware. For example, the example cohort determination circuitry 306 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example census audience size access circuitry 308 accesses census audience sizes from the census data 104 (FIG. 1). For example, the census audience size access circuitry 308 accesses a first census audience size corresponding to panelist-subscribers of Provider 1 114 and a second census audience size of a subset of the panelist-subscribers of Provider 1 114. In this example, the panelist-subscribers of Provider 1 114 includes both panelist-subscribers that use RPD devices and panelist-subscribers that use non-RPD devices, and the subset of the panelist-subscribers of Provider 1 114 corresponds to ones of the panelist-subscribers of Provider 1 114 that use RPD devices only. In some examples, the example census audience size access circuitry 308 is instantiated by processor circuitry executing census audience size access instructions.

In some examples, the projection determination circuitry 126 includes second means for accessing census audience sizes. For example, the second means for accessing may be implemented by example census audience size access circuitry 308. In some examples, the example census audience size access circuitry 308 may be instantiated by processor circuitry such as the example processor circuitry 912 of FIG. 9. For instance, the example census audience size access circuitry 308 may be instantiated by the example microprocessor 1000 of FIG. 10 executing machine executable instructions. In some examples, the example census audience size access circuitry 308 may be instantiated by hardware logic circuitry, which may be implemented by an ASIC, XPU, or the FPGA circuitry 1100 of FIG. 11 structured to perform operations corresponding to the machine readable instructions. Additionally or alternatively, the example census audience size access circuitry 308 may be instantiated by any other combination of hardware, software, and/or firmware. For example, the example census audience size access circuitry 308 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

FIG. 4 illustrates example projection cohorts 400 that can be implemented using examples disclosed herein. The example projection cohorts include a projector group 402 and a projectee group 404. For example, one of the projector groups 402 of an example cohort 406 includes the audience size 202 of the subset of panelist-subscribers of Provider 1 114. A corresponding one of the projectee groups 404 for the example cohort 406 includes the audience size 200 for the panelist-subscribers of Provider 114. In some examples, the example panel audience size access circuitry 300 (FIG. 3) can access audience sizes for each of the projector groups 402 and for each of the projectee groups 404 represented in example projection cohorts 408, 410, 412, 414, 416, 418, 420, 422, 424, 426, 428, 430, 432, 434. In the example of FIG. 4, media providers can include audience size data corresponding to over-the-air (OTA) audiences and/or broadband only (BBO) audiences. Additionally or alternatively, media providers can include audience size data corresponding to connected TV (CTV) audiences.

Figure 5:
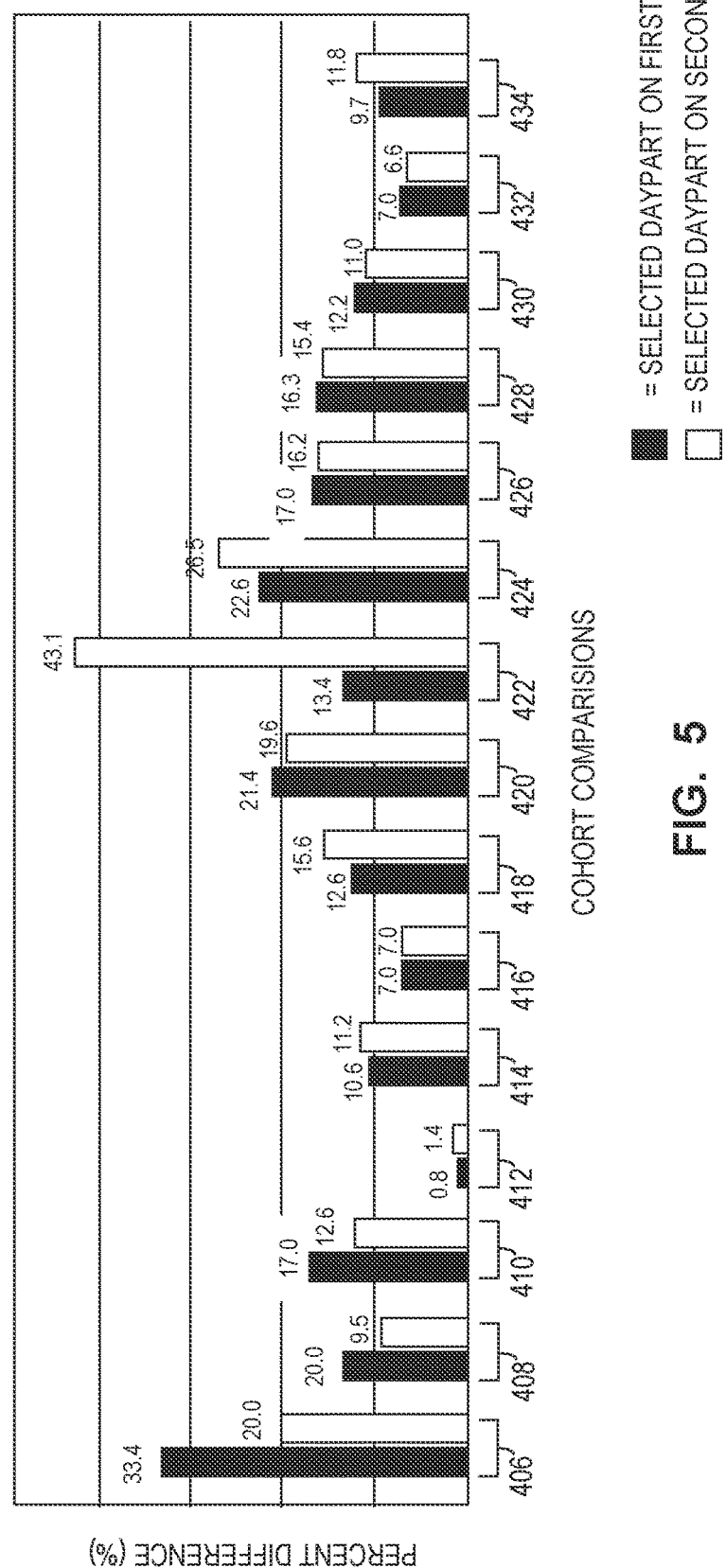
FIG. 5 illustrates an example bar graph of audience size data corresponding to the projection cohorts of FIG. 4.

FIG. 5 illustrates an example bar graph 500 of audience size data corresponding to the projection cohorts 400 (e.g., projection cohorts 406, 408, 410, 412, 414, 416, 418, 420, 422, 424, 426, 428, 430, 432, 434) of FIG. 4. For example, the cohort 406 includes audience sizes corresponding to the media network. In particular, the relative percent absolute difference is calculated with the audience size 206 (FIG. 2) for a selected media network and the audience size 204 (FIG. 2) for the same selected media network. In some examples, the example bar graph 500 of the audience size data is associated with a daypart (e.g., primetime, full day, etc.). In the example of FIG. 5, the relative percent absolute differences are calculated for a first time period (e.g., November 2020) and a second time period (e.g., December 2020). In some examples, the relative percent absolute difference is compared to a threshold (e.g., a percentage threshold, such as, 8% or any other suitable percentage).

In the example of FIG. 5, a relative percent absolute difference is calculated for each of the projection cohorts 406, 408, 410, 412, 414, 416, 418, 420, 422, 424, 426, 428, 430, 432, 434. For example, the cohort 406 includes audience sizes corresponding to a media network. In particular, the relative percent absolute difference is calculated with the audience size 206 (FIG. 2) for a selected media network and the audience size 204 (FIG. 2) for the same selected media network. Example equation 1, described in detail below, represents an example relative percent absolute difference calculation for the example cohort 406.

$$RPAD = \frac{|\text{total footprint} - \text{partial footprint}|}{\text{partial footprint}} * 100 \quad \text{(Equation 1)}$$

In example equation 1 above, RPAD is determined as the relative percent absolute difference. In example equation 1 above, the total footprint is determined as the panel audience size of total subscribers of an example provider and the partial footprint is determined as the panel audience size of an RPC subset of the panelist-subscribers of the example provider. In equation 1 above, RPAD is determined for a selected media network (e.g., an average of multiple media networks). In the example of FIG. 1, equation 1 is utilized for each of the example cohorts 406, 408, 410, 412, 414, 416, 418, 420, 422, 424, 426, 428, 430, 432, 434 for the selected media network.

For example, for the example cohort 406, the example equation 2, described in detail below represents an example relative percent absolute difference calculation of the first time period (e.g., November 2020).

$$RPAD = \frac{|\text{Total Provider 1 footprint} - \text{Provider 1} RPD \text{ footprint}|}{\text{Provider 1} RPD \text{ footprint}} * 100 \quad \text{(Equation 2)}$$

In example equation 2 above, RPAD is determined as the relative percent absolute difference for the example cohort 406 at the first time period. In example equation 2 above, the total Provider 1 footprint is determined as the audience size 204 corresponding to the panel audience size of total subscribers of example Provider 1 114 for the selected media network. In example equation 2 above, the Provider 1 RPD footprint is determined as the audience size 206 corresponding to the panel audience size of an RPD subset of the panelist-subscribers of the example Provider 1 114 for the selected media network. In some examples, the relative percent absolute difference for the example cohort 406 is referred to as "Provider 1 RPD footprint vs. Total Provider 1 footprint". In this example, the "Total Provider 1 footprint" corresponds to panelist-subscribers that use RPD devices and/or non-RPD devices, and the "Provider 1 RPD footprint" corresponds to a subset of ones of the panelist-subscribers that use RPD devices only. In the example of FIG. 5, the shaded bar of example cohort 406 corresponds to the relative percent absolute difference determined using equation 2 for the first time period and the unshaded bar for the example cohort 406 corresponds to the relative percent absolute difference determined by equation 2 for the second time period.

The shaded bar and the unshaded bar for the example cohort 408 represent relative percent absolute differences determined using equation 1 above. The shaded bar of cohort 408 represents a relative percent absolute difference between Provider 2 RPD footprint vs. Total Provider 2 footprint for a selected daypart or time period (e.g., primetime or any other daypart) on a first date for selected media networks under study, in which "Total Provider 2 footprint" represents the panelist-subscribers of Provider 2 that access media via RPD devices and/or non-RPD devices, and "Provider 2 RPD footprint" is a subset of ones of the panelist-subscribers of Provider 2 that access media via RPD devices only. The unshaded bar of cohort 408 represents a relative percent absolute difference between Provider 2 RPD footprint vs. Total Provider 2 footprint for the same daypart or time period on a second date for the same selected media networks under study.

The shaded bar and the unshaded bar for the example cohort 410 represent relative percent absolute differences determined using equation 1 above. The shaded bar of cohort 410 represents a relative percent absolute difference between Provider 1 RPD and Provider 2 RPD footprint vs. Total CablePlus footprint for the selected daypart or time period (e.g., primetime or any other daypart) on the first date for the selected media networks under study, in which "Total CablePlus footprint" represents the panelist-subscribers of Provider 1 and Provider 2 that access media via cableplus devices (e.g., cable devices and/or satellite devices), and "Provider 1 RPD and Provider 2 RPD footprint" is a subset of ones of the panelist-subscribers of Provider 1 and Provider 2 that access media via RPD devices only. The unshaded bar of cohort 410 represents a relative percent absolute difference between Provider 1 RPD and Provider 2 RPD footprint vs. Total Cable footprint for the same selected daypart or time period for the same selected media networks under study.

The shaded bar and the unshaded bar for the example cohort 412 represent relative percent absolute differences determined using equation 1 above. The shaded bar of cohort 412 represents a relative percent absolute difference between Provider 3 ACR footprint vs. Total Provider 3 footprint for the selected daypart or time period (e.g., primetime or any other daypart) on the first date for the selected media networks under study, in which "Total Provider 3 footprint" represents the panelist-subscribers of Provider 3 that access media via ACR devices and/or non-ACR devices, and "Provider 3 ACR footprint" is a subset of ones of the panelist-subscribers of Provider 3 that access media via ACR-enabled devices only. The unshaded bar of cohort 412 represents a relative percent absolute difference between Provider 3 ACR footprint vs. Total Provider 3 ACR footprint for the same selected daypart or time period on the second date for the same selected media networks under study.

The shaded bar and the unshaded bar for the example cohort 414 represent relative percent absolute differences determined using equation 1 above. The shaded bar of cohort 414 represents a relative percent absolute difference between Provider 4 ACR footprint vs. Total Provider 4 footprint for the selected daypart or time period (e.g., primetime or any other daypart) on the first date for the selected media networks under study, in which "Total Provider 4 footprint" represents the panelist-subscribers of Provider 4 that access media via ACR devices and/or non-ACR devices, and "Provider 4 ACR footprint" is a subset of ones of the panelist-subscribers of Provider 4 that access media via ACR-enabled devices only. The unshaded bar of cohort 414 represents a relative percent absolute difference between Provider 4 ACR footprint vs. Total Provider 4 ACR footprint for the same selected daypart or time period on the second date for the same selected media networks under study.

The shaded bar and the unshaded bar for the example cohort 416 represent relative percent absolute differences determined using equation 1 above. The shaded bar of cohort 416 represents a relative percent absolute difference between Provider 3 ACR and Provider 4 ACR footprint vs. Total Smart TV footprint for the selected daypart or time period (e.g., primetime or any other daypart) on the first date for the selected media networks under study, in which "Total Smart TV footprint" represents the panelist-subscribers of Provider 3 and Provider 4 that access media via ACR-enable devices and/or non-ACR-enable devices, and "Provider 3 ACR and Provider 4 ACR footprint" is a subset of ones of the panelist-subscribers of Provider 3 and Provider 4 that access media via ACR-enabled devices only. The unshaded bar of cohort 416 represents a relative percent absolute difference between Provider 3 ACR and Provider 4 ACR footprint vs. Total Smart TV footprint for the same selected daypart or time period on the second date for the same selected media networks under study.

The shaded bar and the unshaded bar for the example cohort 418 represents relative percent absolute differences determined using equation 1 above. The shaded bar of cohort 418 represents a relative percent absolute difference between Provider 3 ACR and Provider 4 ACR footprint vs. Total Connected TV (CTV) footprint for the selected daypart or time period (e.g., primetime or any other daypart) on the first date for the selected media networks under study, in which "Total CTV footprint" represents the panelist-subscribers of Provider 3 and Provider 4 that access media via ACR-enable devices and/or CTV devices (e.g., PlayStation, Xbox, etc.), and "Provider 3 ACR and Provider 4 ACR footprint" is a subset of ones of the panelist-subscribers of Provider 3 and Provider 4 that access media via ACR-enabled devices only. The unshaded bar of cohort 418 represents a relative percent absolute difference between Provider 3 ACR and Provider 4 ACR footprint vs. Total CTV footprint for the same selected daypart or time period on the second date for the same selected media networks under study.

The shaded bar and the unshaded bar for the example cohort 420 represents relative percent absolute differences determined using equation 1 above. The shaded bar of cohort 420 represents a relative percent absolute difference between Provider 3 ACR and Provider 4 ACR OTA or BBO footprint vs. Total OTA or BBO footprint for the selected daypart or time period (e.g., primetime or any other daypart) on the first date for the selected media networks under study, in which "Total OTA or BBO footprint" represents the panelist-subscribers of Provider 3 and Provider 4 that access media via ACR-enabled devices, non-ACR-enabled devices, OTA devices (e.g., antenna receiver devices), and/or BBO devices (e.g., internet streaming devices), and "Provider 3 ACR and Provider 4 ACR OTA or BBO footprint" is a subset of ones of the panelist-subscribers of Provider 3 and Provider 4 that access media via ACR-enabled devices, OTA devices, and/or BBO devices. The unshaded bar of cohort 420 represents a relative percent absolute difference between Provider 3 ACR and Provider 4 ACR OTA or BBO footprint vs. Total OTA or BBO footprint for the same selected daypart or time period on the second date for the same selected media networks under study.

The shaded bar and the unshaded bar for the example cohort 422 represents relative percent absolute differences determined using equation 1 above. The shaded bar of cohort 422 represents a relative percent absolute difference between Provider 3 ACR and Provider 4 ACR OTA footprint vs. Total OTA footprint for the selected daypart or time period (e.g., primetime or any other daypart) on the first date for the selected media networks under study, in which "Total OTA footprint" represents the panelist-subscribers of Provider 3 and Provider 4 that access media via ACR-enabled devices, non-ACR-enabled devices, and/or OTA devices, and "Provider 3 ACR and Provider 4 ACR OTA footprint" is a subset of ones of the panelist-subscribers of Provider 3 and Provider 4 that access media via ACR-enabled devices and OTA devices. The unshaded bar of cohort 422 represents a relative percent absolute difference between Provider 3 ACR and Provider 4 ACR OTA footprint vs. Total OTA footprint for the same selected daypart or time period on the second date for the same selected media networks under study.

The shaded bar and the unshaded bar for the example cohort 424 represent relative percent absolute differences determined using equation 1 above. The shaded bar of cohort 424 represents a relative percent absolute difference between Provider 3 ACR and Provider 4 ACR BBO footprint vs. Total BBO footprint for the selected daypart or time period (e.g., primetime or any other daypart) on the first date for the selected media networks under study, in which "Total BBO footprint" represents the panelist-subscribers of Provider 3 and Provider 4 that access media via ACR-enabled devices, non-ACR-enabled devices, and/or BBO devices, and "Provider 3 ACR and Provider 4 ACR BBO footprint" is a subset of ones of the panelist-subscribers of Provider 3 and Provider 4 that access media via ACR-enabled devices and/or BBO devices. The unshaded bar of cohort 424 represents a relative percent absolute difference between Provider 3 ACR and Provider 4 ACR BBO footprint vs. Total BBO footprint for the same selected daypart or time period on the second date for the same selected media networks under study.

The shaded bar and the unshaded bar for the example cohort 426 represents relative percent absolute differences determined by equation 1 above. The shaded bar of cohort 426 represents a relative percent absolute difference between Provider 3 ACR and Provider 4 ACR footprint that is CablePlus but not Provider 1 RPD or Provider 2 RPD vs. Total CablePlus homes footprint that are not Provider 1 RPD or Provider 2 RPD for the selected daypart or time period (e.g., primetime or any other daypart) on the first date for the selected media networks under study, in which "Total CablePlus homes footprint that are not Provider 1 RPD or Provider 2 RPD" represents the panelist-subscribers of Provider 3 and Provider 4 that access media via ACR-enabled devices, non-ACR-enabled devices, and/or CablePlus devices that are not Provider 1 RPD devices or Provider 2 RPD devices, and "Provider 3 ACR and Provider 4 ACR footprint that is CablePlus but not Provider 1 RPD or Provider 2 RPD" is a subset of ones of the panelist-subscribers of Provider 3 and Provider 4 that access media via ACR-enabled devices and/or CablePlus devices that are not Provider 1 RPD devices or Provider 2 RPD devices. The unshaded bar of cohort 426 represents a relative percent absolute difference between Provider 3 ACR and Provider 4 ACR footprint that is CablePlus but not Provider 1 RPD or Provider 2 RPD vs. Total CablePlus homes footprint that are not Provider 1 RPD or Provider 2 RPD for the same selected daypart or time period on the second date for the same selected media networks under study.

The shaded bar and the unshaded bar for the example cohort 428 represents relative percent absolute differences determined using equation 1 above. The shaded bar of cohort 428 represents a relative percent absolute difference between Provider 3 ACR and Provider 4 ACR footprint that is CablePlus but not Provider 1 or Provider 2 vs. Total CablePlus homes footprint that are not Provider 1 or Provider 2 for the selected daypart or time period (e.g., primetime or any other daypart) on the first date for the selected media networks under study, in which "Total CablePlus homes footprint that are not Provider 1 and Provider 2" represents the panelist-subscribers of Provider 3 and Provider 4 that access media via ACR-enabled devices, non-ACR-enabled devices, and/or CablePlus devices that are not Provider 1 devices or Provider 2 devices, and "Provider 3 ACR and Provider 4 ACR footprint that is CablePlus but not Provider 1 and Provider 2" is a subset of ones of the panelist-subscribers of Provider 3 and Provider 4 that access media via ACR-enabled devices and/or CablePlus devices that are not Provider 1 devices or Provider 2 devices. The unshaded bar of cohort 428 represents a relative percent absolute difference between Provider 3 ACR and Provider 4 ACR footprint that is CablePlus but not Provider 1 and Provider 2 vs. Total CablePlus homes footprint that are not Provider 1 and Provider 2 for the same selected daypart or time period on the second date for the same selected media networks under study.

The shaded bar and the unshaded bar for the example cohort 430 represents relative percent absolute differences determined using equation 1 above. The shaded bar of cohort 430 represents a relative percent absolute difference between Provider 3 ACR and Provider 4 ACR footprint that is CablePlus vs. Total CablePlus footprint for the selected daypart or time period (e.g., primetime or any other daypart) on the first date for the selected media networks under study, in which "Total CablePlus homes footprint" represents the panelist-subscribers of Provider 3 and Provider 4 that access media via ACR-enabled devices, non-ACR-enabled devices, and/or CablePlus devices, and "Provider 3 ACR and Provider 4 ACR footprint that is CablePlus" is a subset of ones of the panelist-subscribers of Provider 3 and Provider 4 that access media via ACR-enabled devices and/or CablePlus devices. The unshaded bar of cohort 430 represents a relative percent absolute difference between Provider 3 ACR and Provider 4 ACR footprint that is CablePlus vs. Total CablePlus footprint for the same selected daypart or time period on the second date for the same selected media networks under study.

The shaded bar and the unshaded bar for the example cohort 432 represents relative percent absolute differences determined using equation 1 above. The shaded bar of cohort 432 represents a relative percent absolute difference between Provider 3 ACR and Provider 4 ACR footprint but not Provider 1 RPD and Provider 2 RPD vs. Total Smart TV footprint that are not Provider 1 RPD or Provider 2 RPD for the selected daypart or time period (e.g., primetime or any other daypart) on the first date for the selected media networks under study, in which "Total Smart TV footprint that are not Provider 1 RPD or Provider 2 RPD" represents the panelist-subscribers of Provider 3 and Provider 4 that access media via ACR-enabled devices, non-ACR-enabled devices, and/or smart TVs that are not Provider 1 RPD devices or Provider 2 RPD devices, and "Provider 3 ACR and Provider 4 ACR footprint that is not Provider 1 RPD and Provider 2 RPD" is a subset of ones of the panelist-subscribers of Provider 3 and Provider 4 that access media via ACR-enabled devices that are not Provider 1 RPD devices or Provider 2 RPD devices. The unshaded bar of cohort 432 represents a relative percent absolute difference between Provider 3 ACR and Provider 4 ACR footprint but not Provider 1 RPD and Provider 2 RPD vs. Total Smart TV footprint that are not Provider 1 RPD or Provider 2 RPD for the same selected daypart or time period on the second date for the same selected media networks under study.

The shaded bar and the unshaded bar for the example cohort 434 represents relative percent absolute differences determined using equation 1 above. The shaded bar of cohort 434 represents a relative percent absolute difference between Provider 1 RPD, Provider 2 RPD, Provider 3 ACR, and Provider 4 ACR footprint vs. CablePlus or CTV footprint for the selected daypart or time period (e.g., primetime or any other daypart) on the first date for the selected media networks under study, in which "CablePlus or CTV footprint" represents the panelist-subscribers of Provider 1, Provider 2, Provider 3, and Provider 4 that access media via ACR-enabled devices, CablePlus devices, and/or CTV devices, and "Provider 1 RPD, Provider 2 RPD, Provider 3 ACR, and Provider 4 ACR" is a subset of ones of the panelist-subscribers of Provider 1, Provider 2, Provider 3, and Provider 4 that access media via RPD devices or ACR-enabled devices. The unshaded bar of cohort 432 represents a relative percent absolute difference between Provider 1 RPD, Provider 2 RPD, Provider 3 ACR, and Provider 4 ACR footprint vs. CablePlus or CTV footprint for the same selected daypart or time period on the second date for the same selected media networks under study.

FIG. 6 illustrates an example stratification table 600 that can be used to determine a stratification group (e.g., a demographic group) in examples disclosed. The example stratification table 600 includes demographic groups 602, percentages 604, percentages 606, and differences 608. In the example of FIG. 6, the percentages 604 correspond to percentages of the demographic groups 602 in the audience size 202 (FIG. 2). For example, demographic group 610 denotes household income between $50,000 and $100,000. Accordingly, 37% of the audience size 202 has a household income between $50,000 and $100,000. Further, 37% of the audience size 200 has a household income between $50,000 and $100,000. In some examples, the stratification circuitry 304 (FIG. 3) can determine a difference between the percentage of the audience size 202 and the percentage of the audience size 200 (e.g., 37%–37%=0%).

While an example manner of implementing the projection determination circuitry 126 of FIG. 1 is illustrated in FIG. 3, one or more of the elements, processes, and/or devices illustrated in FIG. 3 may be combined, divided, re-arranged, omitted, eliminated, and/or implemented in any other way. Further, the example panel audience size access circuitry 300, the example percent difference calculator circuitry 302, the example stratification circuitry 304, the example cohort determination circuitry 306, the example census audience size access circuitry 308, and/or, more generally, the example projection determination circuitry 126 of FIG. 1, may be implemented by hardware alone or by hardware in combination with software and/or firmware. Thus, for example, any of the example panel audience size access circuitry 300, the example percent difference calculator circuitry 302, the example stratification circuitry 304, the example cohort determination circuitry 306, the example census audience size access circuitry 308 and/or, more generally, the example projection determination circuitry 126, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example projection determination circuitry 126 of FIG. 1 may include one or more elements, processes, and/or devices in addition to, or instead of, those illustrated in FIG. 3, and/or may include more than one of any or all of the illustrated elements, processes and devices.

Figure 7:
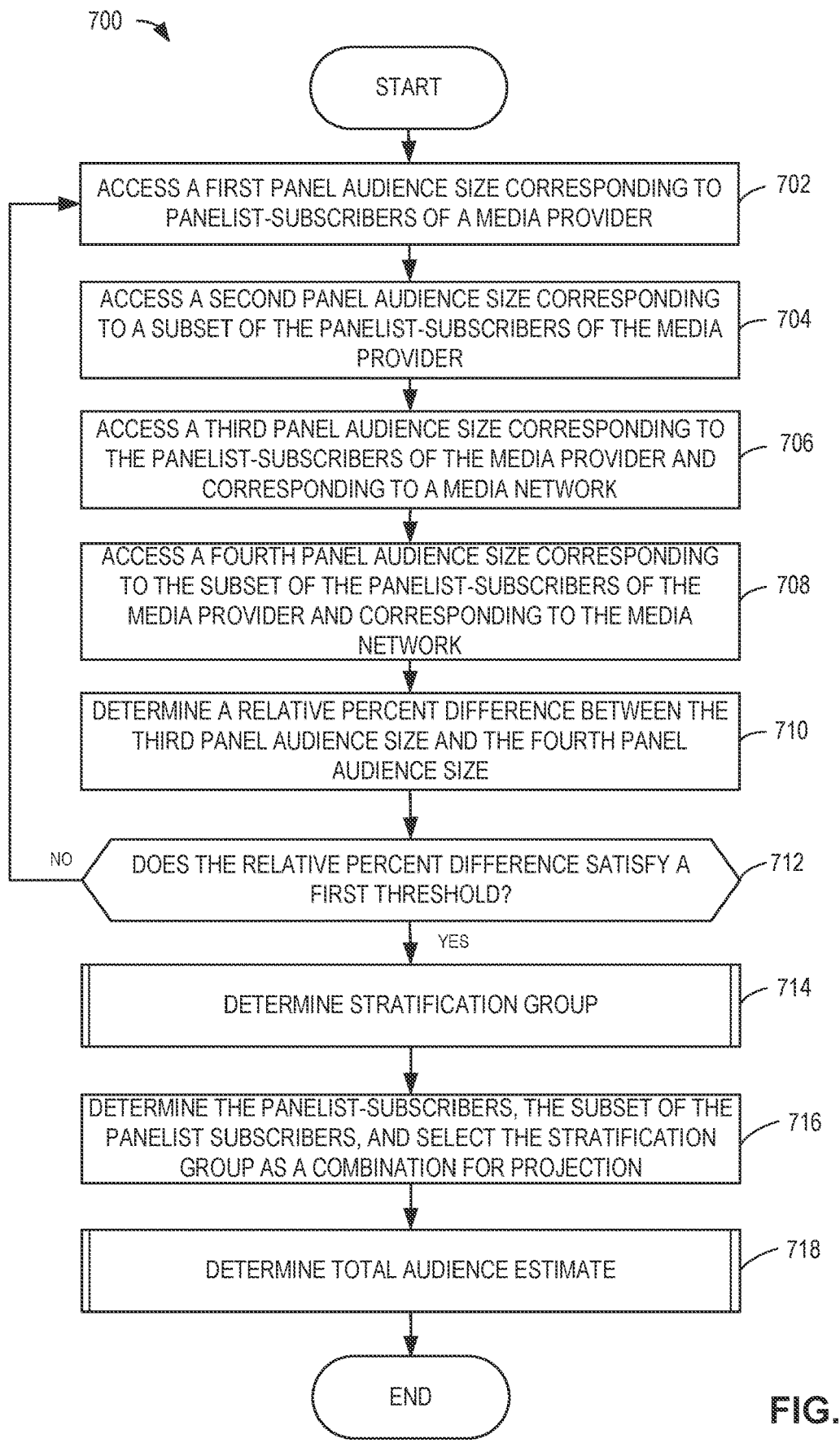
FIG. 7 is a flowchart representative of example machine readable instructions and/or example operations that may be executed by example processor circuitry to implement the example projection determination circuitry of FIGS. 1 and 3.

Flowcharts representative of example machine readable instructions, which may be executed to configure processor circuitry to implement the example projection determination circuitry 126 of FIG. 3, is shown in FIGS. 7 and 8. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 3, many other methods of implementing the example projection determination circuitry 126 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7 and 8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by processor circuitry to determine a cohort and stratification group for projection.

The machine readable instructions and/or the operations 700 of FIG. 7 begin at block 702, at which the example panel audience size access circuitry 300 (FIG. 3) accesses a first panel audience size corresponding to subscribers of a media provider (e.g., one of the media providers 102 of FIG. 1). For example, the panel audience size access circuitry 300 accesses the audience size 200 (FIG. 2) corresponding to panelist-subscribers of Provider 1 114.

At block 704, the example panel audience size access circuitry 300 accesses a second panel audience size corresponding to a subset of panelist-subscribers of the media provider. For example, the panel audience size access circuitry 300 accesses the audience size 202 (FIG. 2) corresponding to the subset of the panelist-subscribers of Provider 1 114.

At block 706, the example panel audience size access circuitry 300 accesses a third panel audience size corresponding to panelist-subscribers of the media provider and corresponding to a media network. For example, the panel audience size access circuitry 300 accesses the audience size 204 (FIG. 2) corresponding to ones of the panelist-subscribers of Provider 1 114 that access the first media network.

At block 708, the example panel audience size access circuitry 300 accesses a fourth panel audience size corresponding to the subset of the panelist-subscribers of the media provider and corresponding to the media network. For example, the panel audience size access circuitry 300 accesses the audience size 206 (FIG. 2) corresponding to the subset of the panelist-subscribers of Provider 114 that access the first media network.

At block 710, the example percent difference calculator circuitry 302 (FIG. 3) determines a relative percent absolute difference between the third panel audience size and the fourth panel audience size. For example, the percent difference calculator circuitry 302 determines a relative percent difference between the audience size 204 and the audience size 206.

At block 712, the example percent difference calculator circuitry 302 determines whether the relative percent absolute difference satisfies a threshold. For example, the threshold value may be user input selected by a user based on how similar an audience size of a larger audience (e.g., a panelist-subscribers audience size) should be to an audience size of a subset of the larger audience (e.g., a subset audience size of the panelist-subscribers audience size). In some examples, the threshold value may be stored in a configuration file. If the relative percent absolute difference percent difference does not satisfy the first threshold (block 712: NO) the process returns to block 702. If the relative percent absolute difference does satisfy the threshold (block 712: YES) the process proceeds to block 714. In some examples, the first threshold is 7% or any other suitable percentage value. Accordingly, the relative percent absolute difference associated with the cohort 406 does not satisfy the first threshold of 7% (e.g., 33.4% is greater than 7% and 20% is greater than 7%). Alternatively, the relative percent absolute difference associated with the cohorts 412 satisfies the threshold of 7% (e.g., 0.8% is less than 7% and 1.4% is less than 7%).

At block 714, the example stratification circuitry 304 (FIG. 3) determines a stratification group. Example instructions to determine a stratification group are described below in connection with FIG. 8A.

At block 716, the example cohort determination circuitry 306 (FIG. 3) determines the panelist-subscribers group, the subset of the panelist-subscribers group, and selects the stratification group as a combination useable for projection to determine (or estimate) an audience size for a larger population of interest. For example, the cohort determination circuitry 306 determines the audience size 200, the audience size 202, and one of the stratification groups 610 (FIG. 6) (e.g., a demographic group) as a viable combination for projecting audience data to determine (or estimate) an audience size of a larger population of interest (e.g., a population of a particular geographic area of interest such as a country, a state, a province, a territory, a metropolitan area, a county, a city, etc.). In some examples, instructions of FIG. 7 may be repeated multiple times to select multiple ones of the stratification groups 610 to use in projecting audience data to determine (or estimate) an audience size of a larger population of interest. The audience size may be for a particular media network, for multiple media networks, for one or more media programs or media items, for one or more media networks or one or more media programs or media items accessed during a particular daypart, for one or more media networks or one or more media programs or media items accessed in a particular geographic area, etc.

At block 718, the example cohort determination circuitry 306 determines a total audience estimate for a particular population of interest (e.g., a population of a particular geographic area of interest such as a country, a state, a province, a territory, a metropolitan area, a county, a city, etc.). Example instructions to determine a total audience estimate at block 718 are described below in connection with FIG. 8B.

Figure 8A:
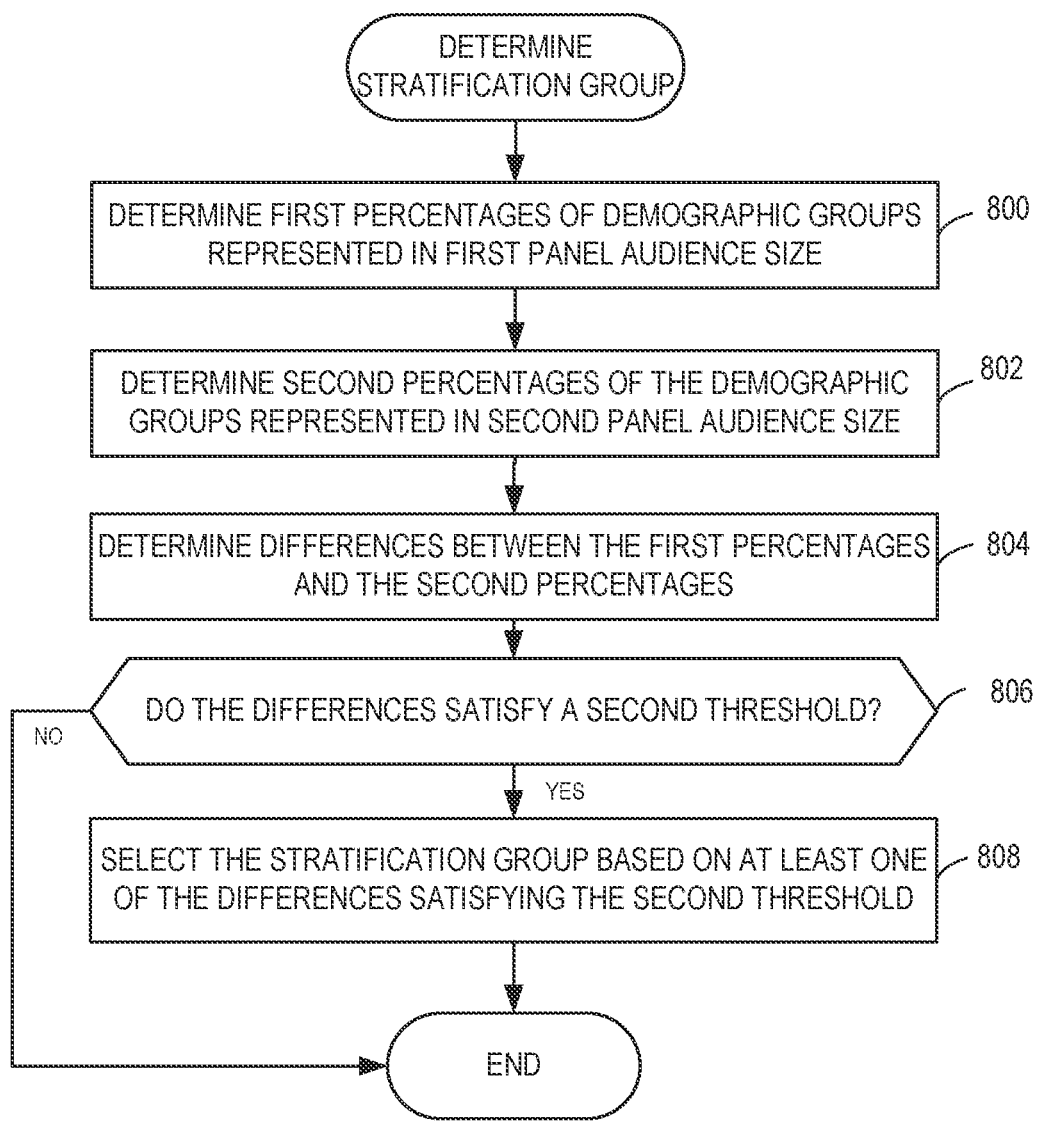
FIG. 8A is a flowchart representative of example machine readable instructions and/or example operations that may be executed by example processor circuitry to implement the example projection determination circuitry of FIGS. 1 and 3.

FIG. 8A is a flowchart representative of example machine readable instructions and/or example operations that may be executed and/or instantiated by processor circuitry to implement the example stratification circuitry 304 (FIG. 3) to determine a stratification group. The example instructions of FIG. 8A may be used to implement block 714 of FIG. 7. The example machine readable instructions and/or the operations of FIG. 8A begin at block 800, at which the example stratification circuitry 304 determines first percentages of demographic groups (e.g., the demographic groups 602) represented in a first panel audience size. For example, the stratification circuitry 304 determines that 37% of the audience size 200 (FIG. 2) is over the age of 55, 37% of the audience size 200 has a household income between $50,000 and $100,000, etc.

At block 802, the example stratification circuitry 304 determines second percentages of the demographic groups represented in a second panel audience size. For example, the stratification circuitry 304 determines that 33% of the audience size 202 (FIG. 2) is over the age of 55, 37% of the audience size 202 has a household income between $50,000 and $100,000, etc.

At block 804, the example stratification circuitry 304 determines differences between the first percentages and the second percentages of the demographic groups. For example, the stratification circuitry 304 determines a difference between the percentages for the age stratification group (e.g., audience members over the age of 55) based on subtracting the percentage of the audience size 200 from the percentage of the audience size 202 (e.g., |33%−37%|=4%). Additionally or alternatively, the stratification circuitry 304 determines a difference between the percentages of the household income stratification group 610 (FIG. 6) (e.g., household income between $50,000 and $100,000) based on subtracting the percentage of the audience size 200 from the percentage of the audience size 202 (e.g., 37%−37%=0%).

At block 806, the example stratification circuitry 304 determines whether ones of the differences satisfy a second threshold. If at least one of the differences satisfies the second threshold (block 806: YES), then process proceeds to block 808. If the differences do not satisfy the second threshold (block 806: NO) then the process of FIG. 8 ends. In some examples, the second threshold is 1%, 2% or any other suitable percentage. For example, the second threshold value may be user input selected by a user based on how many stratification groups are desired to be selected for a particular audience study. In some examples, the user may target the smallest possible percentage value as the second threshold value to qualify a sufficient number of stratification groups to satisfy an expectation of a customer of the audience study. In some examples, the second threshold value may be stored in a configuration file. Accordingly, the difference associated with the age demographic group for audience members over the age of 55 does not satisfy the second threshold of 1% (e.g., 4% is greater than 1%). Alternatively, the difference associated with the income demographic group 610 satisfies the threshold of 1% (e.g., 0% is less than 1%).

At block 808, the example stratification circuitry 304 selects the stratification group for the viable combination based on at least one of the differences corresponding to the to-be-selected stratification group satisfying the second threshold. For example, the stratification circuitry 304 determines the income demographic group 610 as the stratification group. Then, the example instructions or operations of FIG. 8A end.

Figure 8B:
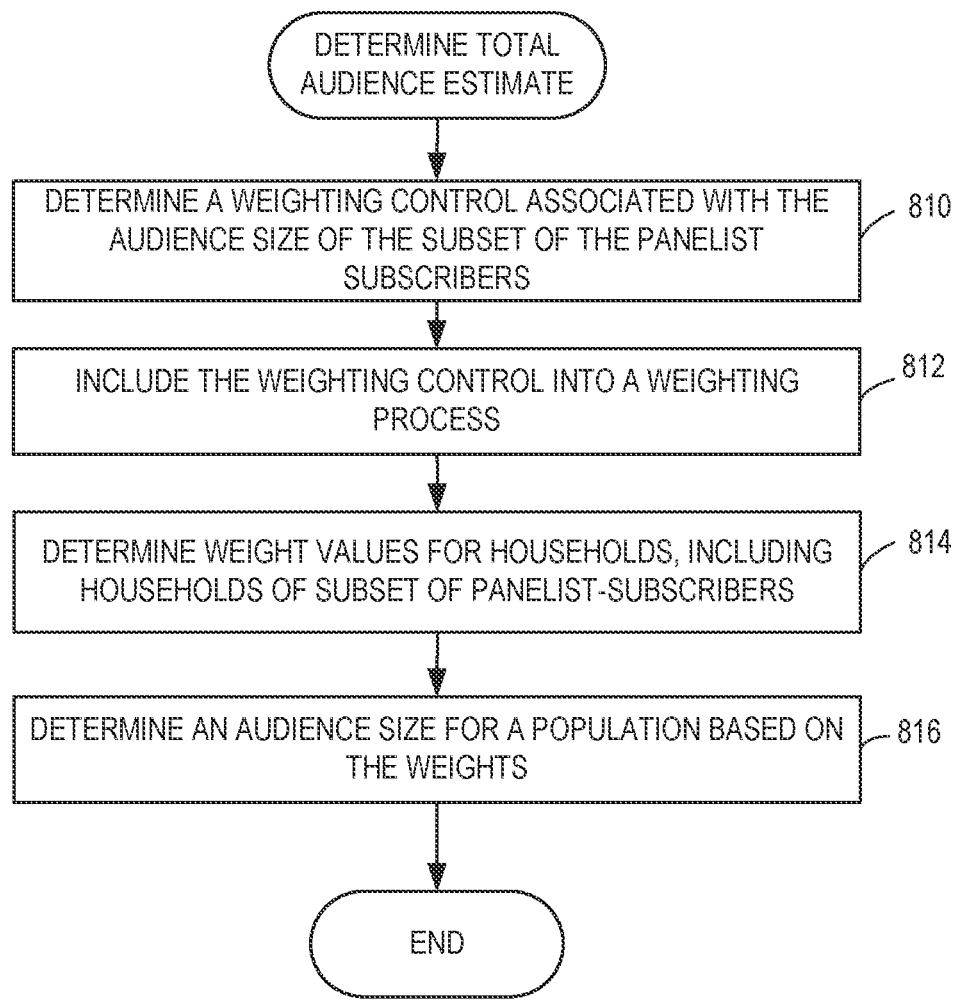
FIG. 8B is a flowchart representative of example machine readable instructions and/or example operations that may be executed by example processor circuitry to implement the example projection determination circuitry of FIGS. 1 and 3.

FIG. 8B is a flowchart representative of example machine readable instructions and/or example operations that may be executed and/or instantiated by processor circuitry to implement the example cohort determination circuitry 306 (FIG. 3) to estimate a total audience size for a particular population of interest (e.g., a population in a particular geographic area). The example instructions of FIG. 8B may be used to implement block 718 of FIG. 7. The example machine readable instructions and/or the operations of FIG. 8B begin at block 800, at which the example cohort determination circuitry 306 determines a weighting control associated with the audience size of the subset of the panelist-subscribers. For example, the cohort determination circuitry 306 determines a weighting control associated with the audience size 202 (FIG. 2) of the subset of the panelist-subscribers of Provider 1 114 (FIG. 1). For example, the weighting control corresponds to a demographic group 610 represented in the stratification table 600 of FIG. 6. In the illustrated example, the audience size 202 of the subset of the panelist-subscribers of Provider 1 114 corresponds to the subset of the panelist-subscribers group selected at block 716 of FIG. 7.

At block 812, the example cohort determination circuitry 306 includes (e.g., adds) the weighting control into a weighting process. In some examples, the weighting process can be an iterative proportional fitting (IPF) algorithm that iteratively processes multiple weighting controls to find weights that projects or scales the audience size 202 of the subset of the panelist-subscribers of Provider 1 114 (e.g., corresponding to the subset of the panelist-subscribers group selected at block 716 of FIG. 7) to equal or be substantially the same as the audience size 200 (FIG. 2) of the panelist-subscribers of Provider 1 114 (e.g., corresponding to the panelist-subscribers group selected at block 716 of FIG. 7). In this manner, a weight for a household represented in the subset of the panelist-subscribers group can be used to project or scale that household to an audience size estimate of a larger target population of interest.

At block 814, the example cohort determination circuitry 306 determines weight values for households (e.g., all households of panelist-subscribers that access media via the media providers 102 of FIG. 1), including households represented in the subset of panelist-subscribers group selected at block 716 of FIG. 7. For examples, the instructions of FIG. 8B may execute blocks 810, 812, and 814 multiple times while adding additional weight controls (e.g., different demographic groups) at different iterations of the IPF process so that the IPF process eventually determines a separate single weight value for each household of the selected subset of the panelist-subscribers group that projects or scales that household to represent a number of households in the target population for the multiple ones of the input weight controls. That is, per household, the IPF process converges multiple weight values for the multiple input weight controls to be represented by a single weight value for that household. In this example, that single weight value is a number of households in the larger population of interest that are represented by the one household of the selected subset of the panelist-subscribers group. For example, a weight value of w=700 for a household of the selected subset of the panelist-subscribers group means that household represents 700 households in the larger population of interest.

At block 816, the example cohort determination circuitry 306 determines (or estimates) an audience size for a population of interest based on the weights. In some examples, the cohort determination circuitry 306 sums the weight values assigned to each household included in the audience size 202 of the subset of the panelist-subscribers of Provider 1 114, the sum of the weights totaling an audience size for the larger population of interest. For example, if the subset of the panelist-subscribers of Provider 1 114 includes five households with weight values of $w_1=200$, $w_2=120$, $w_3=500$, $w_4=1000$, and $w_5=25$, the estimated audience size for the larger population of interest is the sum of all five household weights which, in this example, equals 1845. The example instructions or operations of FIG. 8B end.

Figure 9:
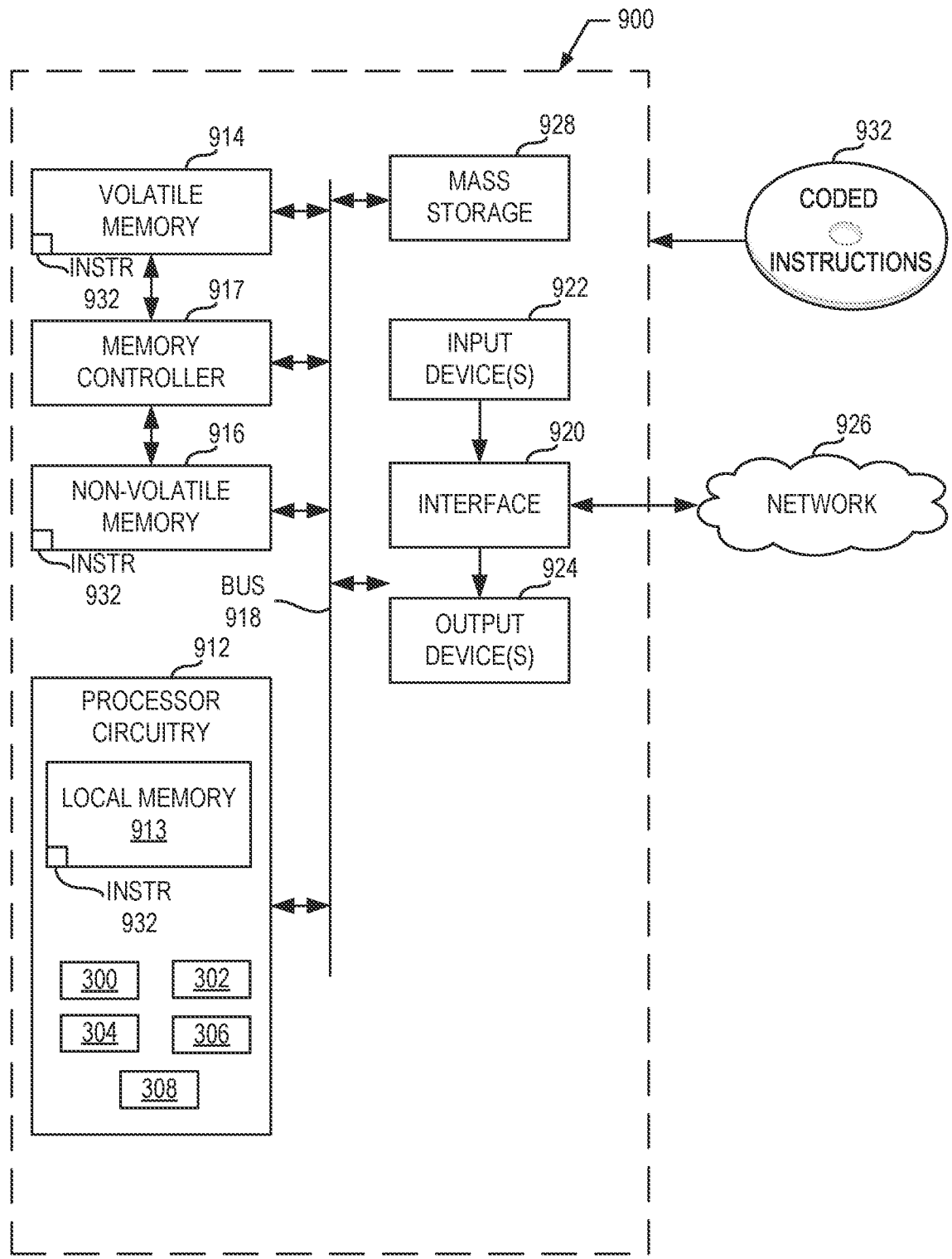
FIG. 9 is a block diagram of an example processing platform including processor circuitry structured to execute the example machine readable instructions and/or the example operations of FIGS. 7 and 8 to implement the example projection determination circuitry of FIGS. 1 and 3.

FIG. 9 is a block diagram of an example processor platform 900 structured to execute and/or instantiate the machine readable instructions and/or the operations of FIGS. 7, 8A, and 8B to implement the projection determination circuitry 126 of FIG. 3. The processor platform 900 can be, for example, a server, a personal computer, a workstation, a self-learning machine (e.g., a neural network), or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example panel audience size access circuitry 300, the example percent difference calculator circuity 302, the example stratification circuitry 304, the example cohort determination circuitry 306, and the example census audience size access circuitry 308.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912.

One or more output devices 924 are also connected to the interface circuitry 920 of the illustrated example. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 932, which may be implemented by the machine readable instructions of FIGS. 7 and 8, may be stored in the mass storage device 928, in the volatile memory 914, in the non-volatile memory 916, and/or on a removable non-transitory computer readable storage medium such as a CD or DVD.

Figure 10:
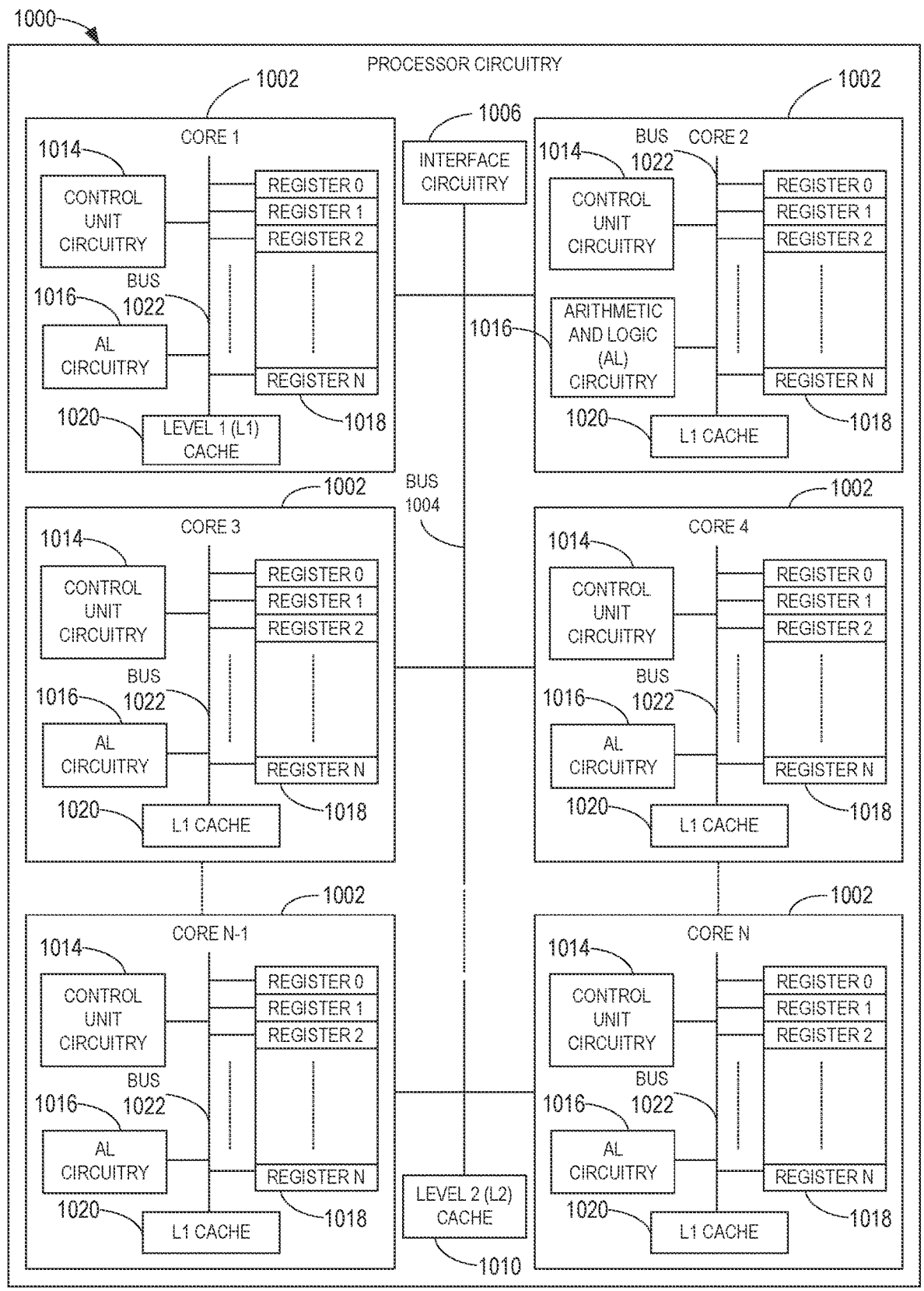
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may be a general purpose microprocessor (e.g., general purpose microprocessor circuitry). The microprocessor 1000 executes some or all of the machine readable instructions of the flowcharts of FIGS. 7 and 8 to effectively instantiate the circuitry of FIG. 3 as logic circuits to perform the operations corresponding to those machine readable instructions. In some such examples, the circuitry of FIG. 3 is instantiated by the hardware circuits of the microprocessor 1000 in combination with the instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 7 and 8.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may be implemented by at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
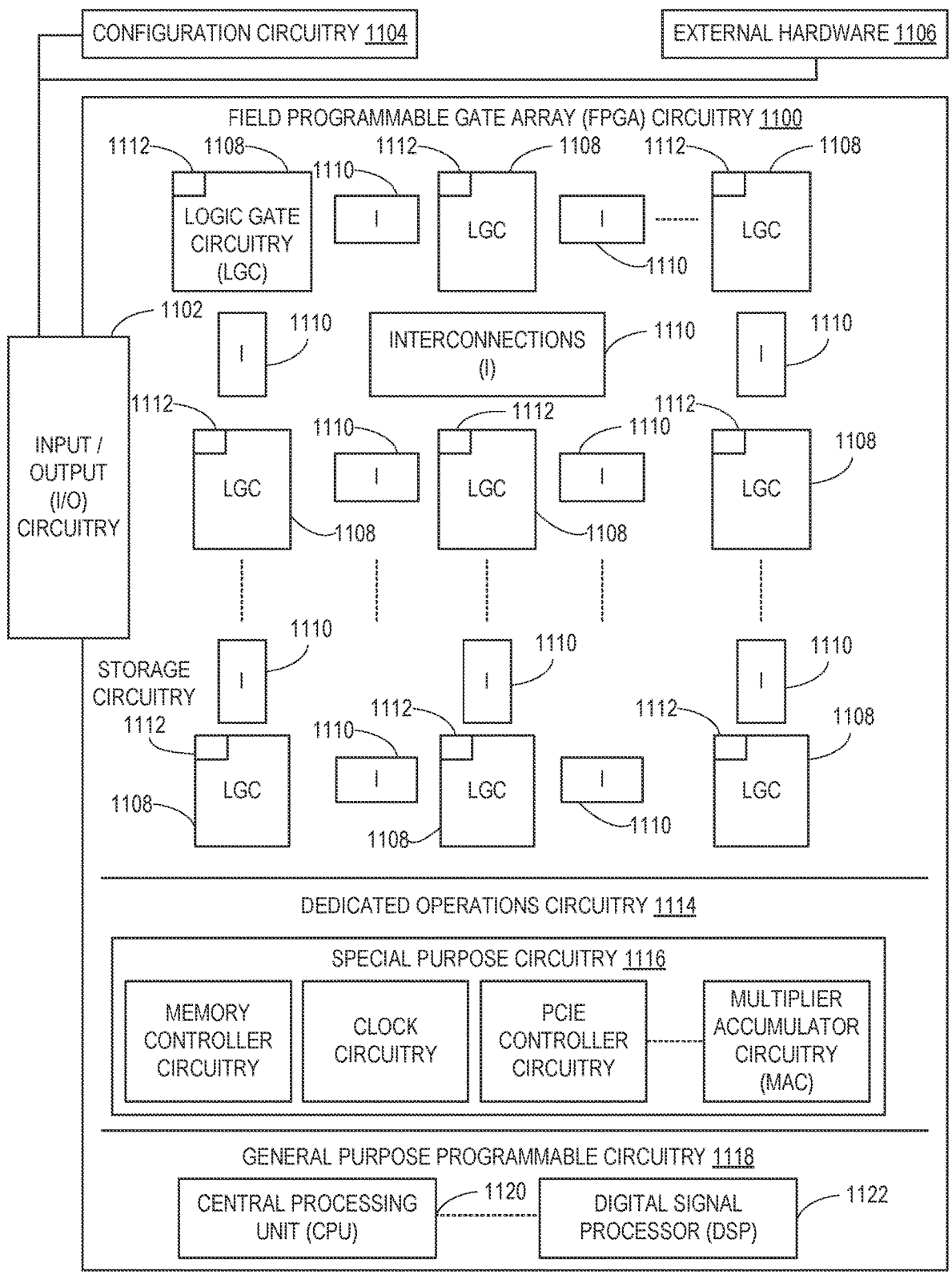
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 7 and 8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 7 and 8. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 7 and 8. As such, the FPGA circuitry 1100 may be structured to effectively instantiate some or all of the machine readable instructions of the flowcharts of FIGS. 7 and 8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIG. 9 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may be implemented by external hardware circuitry. For example, the external hardware 1106 may be implemented by the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations that may correspond to at least some of the machine readable instructions of FIG. 9 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 7 and 8 may be executed by one or more of the cores 1002 of FIG. 10, a second portion of the machine readable instructions represented by the flowcharts of FIGS. 7 and 8 may be executed by the FPGA circuitry 1100 of FIG. 11, and/or a third portion of the machine readable instructions represented by the flowcharts of FIGS. 7 and 8 may be executed by an ASIC. It should be understood that some or all of the circuitry of FIG. 3 may, thus, be instantiated at the same or different times. Some or all of the circuitry may be instantiated, for example, in one or more threads executing concurrently and/or in series. Moreover, in some examples, some or all of the circuitry of FIG. 3 may be implemented within one or more virtual machines and/or containers executing on the microprocessor.

In some examples, the processor circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
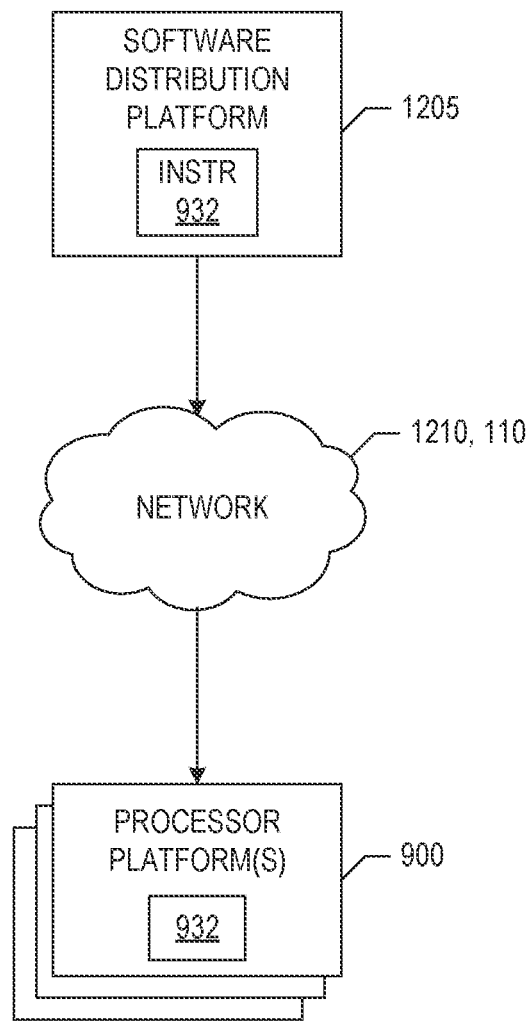
FIG. 12 is a block diagram of an example software distribution platform (e.g., one or more servers) to distribute software (e.g., software corresponding to the example machine readable instructions of FIGS. 6 and 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions of FIGS. 7 and 8, as described above. The one or more servers of the example software distribution platform 1205 are in communication with an example network 1210, which may correspond to any one or more of the Internet and/or any of the example networks 110 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions of FIGS. 7 and 8, may be downloaded to the example processor platform 900, which is to execute the machine readable instructions 932 to implement the projection determination circuitry 126. In some examples, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices.

From the foregoing, it will be appreciated that example systems, methods, apparatus, and articles of manufacture have been disclosed that utilize panel data collected by an AME to overcome at least some of the limitations associated with determining audience metrics nationally and in local markets based on RPD tuning data and/or ACR tuning data. Examples disclosed herein compare panel audience sizes corresponding to subscribers of media providers to panel audience sizes corresponding to subscribers of media providers having media access devices with return path capabilities. In some examples disclosed herein, audience sizes associated with subscribers with return path devices can project onto audience sizes for all subscribers or for other specific populations larger than the group for which the data have been collected. Examples disclosed herein may be used to select projector and projectee combinations with a specific stratification that functions to correct bias in the RPD tuning data and/or the ACR tuning data.

Disclosed systems, methods, apparatus, and articles of manufacture improve the efficiency of using a computing device by correcting bias in return path data. Disclosed systems, methods, apparatus, and articles of manufacture are accordingly directed to one or more improvement(s) in the operation of a machine such as a computer or other electronic and/or mechanical device.

Example 1 includes an apparatus comprising interface circuitry, and processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate panel audience size access circuitry to access a first panel audience size corresponding to subscribers of a media provider and a second panel audience size for a subset of the subscribers of the media provider, the subset of the subscribers to access media via media access devices that include return path capabilities, the first panel audience size and the second panel audience size collected by an audience measurement entity, access a third panel audience size corresponding to the subscribers of the media provider and a fourth panel audience size corresponding to the subset of the subscribers of the media provider, the third panel audience size and the fourth panel audience size collected by the audience measurement entity, the third panel audience size corresponding to a media network, the fourth panel audience size corresponding to the media network, percent difference calculator circuitry to determine a relative percent absolute difference between the third panel audience size and the fourth panel audience size, satisfaction circuitry to, when the relative percent absolute difference satisfies a first threshold determine first percentages of demographic groups corresponding to the first panel audience size and second percentages of the demographic groups corresponding to the second panel audience size, and determine differences between the first percentages and the second percentages, the differences associated with the demographic groups, and cohort determination circuitry to, after at least one of the differences corresponding to at least one of the demographic groups satisfies a second threshold, determine the subscribers, the subset of the subscribers, and the at least one of the demographic groups as useable to determine the audience size of the media network.

Example 2 includes the apparatus of example 1, wherein the media provider is at least one of a cable media provider, a satellite media provider, or a smart television (TV) media provider.

Example 3 includes the apparatus of example 1, wherein the media access devices include at least one of return path data (RPD) devices or automatic content recognition (ACR) enabled devices.

Example 4 includes the apparatus of example 1, wherein the relative percent difference is associated with a daypart.

Example 5 includes the apparatus of example 1, wherein the third panel audience size is a first average panel audience size corresponding to multiple network programs and the fourth panel audience size is a second average panel audience size corresponding to the multiple networks.

Example 6 includes the apparatus of example 1, wherein the first threshold is eight percent.

Example 7 includes the apparatus of example 1, wherein the second threshold is one percent.

Example 8 includes the apparatus of example 1, further including census audience size access circuitry to access a first census audience size corresponding to the subscribers of the media provider and a second census audience size corresponding to the subset of the subscribers of the media provider, the stratification circuitry to determine third percentages of the demographic groups represented in the first census audience size and fourth percentages of the demographic groups represented in the second census audience size, and determine second differences between the third percentages and the fourth percentages, the second differences associated with the demographic groups, and when at least one of the second differences corresponding to the at least one of the demographic groups satisfies the second threshold, the cohort determination circuitry is to determine the subscribers, the subset of the subscribers, and the at least one of the demographic groups as useable to determine the audience size of the media network.

Example 9 includes a system comprising at least one memory, programmable circuitry, and instructions to cause the programmable circuitry to access a first panel audience size corresponding to subscribers of a media provider and a second panel audience size for a subset of the subscribers of the media provider, the subset of the subscribers to access media via media access devices that include return path capabilities, the first panel audience size and the second panel audience size collected by an audience measurement entity, access a third panel audience size corresponding to the subscribers of the media provider and a fourth panel audience size corresponding to the subset of the subscribers of the media provider, the third panel audience size and the fourth panel audience size collected by the audience measurement entity, the third panel audience size corresponding to a media network, the fourth panel audience size corresponding to the media network, determine a relative percent absolute difference between the third panel audience size and the fourth panel audience size, when the relative percent absolute difference satisfies a first threshold, determine first percentages of demographic groups corresponding to the first panel audience size and second percentages of the demographic groups corresponding to the second panel audience size, determine differences between the first percentages and the second percentages, the differences associated with the demographic groups, and when at least one of the differences corresponding to at least one of the demographic groups satisfies a second threshold, determine the subscribers, the subset of the subscribers, and the at least one of the demographic groups as useable to determine the audience size of the media network.

Example 10 includes the system of example 9, wherein the media provider is at least one of a cable media provider, a satellite media provider, or a smart television (TV) media provider.

Example 11 includes the system of example 9, wherein the media access devices include at least one of return path data (RPD) devices or automatic content recognition (ACR) enabled devices.

Example 12 includes the system of example 9, wherein the relative percent difference is associated with a daypart.

Example 13 includes the system of example 9, wherein the third panel audience size is a first average panel audience size corresponding to multiple network programs and the fourth panel audience size is a second average panel audience size corresponding to the multiple networks.

Example 14 includes the system of example 9, wherein the first threshold is eight percent.

Example 15 includes the system of example 9, wherein the second threshold is one percent.

Example 16 includes the system of example 9, wherein the programmable circuitry is to access a first census audience size corresponding to the subscribers of the media provider and a second census audience size corresponding to the subset of the subscribers of the media provider, determine third percentages of the demographic groups represented in the first census audience size and fourth percentages of the demographic groups represented in the second census audience size, determine second differences between the third percentages and the fourth percentages, the second differences associated with the demographic groups, and when at least one of the second differences corresponding to the at least one of the demographic groups satisfies the second threshold, determine the subscribers, the subset of the subscribers, and the at least one of the demographic groups as useable to determine the audience size of the media network.

Example 17 includes at least one non-transitory machine readable storage medium comprising instructions that, when executed, cause processor circuitry to at least access a first panel audience size corresponding to subscribers of a media provider and a second panel audience size for a subset of the subscribers of the media provider, the subset of the subscribers to access media via media access devices that include return path capabilities, the first panel audience size and the second panel audience size collected by an audience measurement entity, access a third panel audience size corresponding to the subscribers of the media provider and a fourth panel audience size corresponding to the subset of the subscribers of the media provider, the third panel audience size and the fourth panel audience size collected by the audience measurement entity, the third panel audience size corresponding to a media network, the fourth panel audience size corresponding to the media network, determine a relative percent absolute difference between the third panel audience size and the fourth panel audience size, when the relative percent absolute difference satisfies a first threshold, determine first percentages of demographic groups corresponding to the first panel audience size and second percentages of the demographic groups corresponding to the second panel audience size, determine differences between the first percentages and the second percentages, the differences associated with the demographic groups, and when at least one of the differences corresponding to at least one of the demographic groups satisfies a second threshold, determine the subscribers, the subset of the subscribers, and the at least one of the demographic groups as a useable to determine the audience size of the media network.

Example 18 includes the at least one non-transitory machine readable storage medium of example 17, wherein the media provider is at least one of a cable media provider, a satellite media provider, or a smart television (TV) media provider.

Example 19 includes the at least one non-transitory machine readable storage medium of example 17, wherein the media access devices include at least one of return path data (RPD) devices or automatic content recognition (ACR) enabled devices.

Example 20 includes the at least one non-transitory machine readable storage medium of example 17, wherein the relative percent difference is associated with a daypart.

Example 21 includes the at least one non-transitory machine readable storage medium of example 17, wherein the third panel audience size is a first average panel audience size corresponding to multiple network programs and the fourth panel audience size is a second average panel audience size corresponding to the multiple networks.

Example 22 includes the at least one non-transitory machine readable storage medium of example 17, wherein the first threshold is eight percent.

Example 23 includes the at least one non-transitory machine readable storage medium of example 17, wherein the second threshold is one percent.

Example 24 includes the at least one non-transitory machine readable storage medium of example 17, wherein the instructions cause the processor circuitry to access a first census audience size corresponding to the subscribers of the media provider and a second census audience size corresponding to the subset of the subscribers of the media provider, determine third percentages of the demographic groups represented in the first census audience size and fourth percentages of the demographic groups represented in the second census audience size, determine second differences between the third percentages and the fourth percentages, the second differences associated with the demographic groups, and when at least one of the second differences corresponding to the at least one of the demographic groups satisfies the second threshold, determine the subscribers, the subset of the subscribers, and the at least one of the demographic groups as useable to determine the audience size of the media network.

Example 25 includes an apparatus comprising first means for accessing to access a first panel audience size corresponding to subscribers of a media provider and a second panel audience size for a subset of the subscribers of the media provider, the subset of the subscribers to access media via media access devices that include return path capabilities, the first panel audience size and the second panel audience size collected by an audience measurement entity, access a third panel audience size corresponding to the subscribers of the media provider and a fourth panel audience size corresponding to the subset of the subscribers of the media provider, the third panel audience size and the fourth panel audience size collected by the audience measurement entity, the third panel audience size corresponding to a media network, the fourth panel audience size corresponding to the media network, first means for determining a relative percent absolute difference between the third panel audience size and the fourth panel audience size, second means for determining to, when the relative percent absolute difference satisfies a first threshold determine first percentages of demographic groups corresponding to the first panel audience size and second percentages of the demographic groups corresponding to the second panel audience size, and determine differences between the first percentages and the second percentages, the differences associated with the demographic groups, and third means for determining to, when at least one of the differences corresponding to at least one of the demographic groups satisfies a second threshold, determine the subscribers, the subset of the subscribers, and the at least one of the demographic groups as useable to determine the audience size of the media network.

Example 26 includes the apparatus of example 25, wherein the media provider is at least one of a cable media provider, a satellite media provider, or a smart television (TV) media provider.

Example 27 includes the apparatus of example 25, wherein the media access devices include at least one of return path data (RPD) devices or automatic content recognition (ACR) enabled devices.

Example 28 includes the apparatus of example 25, wherein the relative percent difference is associated with a daypart.

Example 29 includes the apparatus of example 25, wherein the third panel audience size is a first average panel audience size corresponding to multiple network programs and the fourth panel audience size is a second average panel audience size corresponding to the multiple networks.

Example 30 includes the apparatus of example 25, wherein the first threshold is eight percent.

Example 31 includes the apparatus of example 25, wherein the second threshold is one percent.

Example 32 includes the apparatus of example 25, further including second means for accessing a first census audience size corresponding to the subscribers of the media provider and a second census audience size corresponding to the subset of the subscribers of the media provider, the second means for determining to determine third percentages of the demographic groups represented in the first census audience size and fourth percentages of the demographic groups represented in the second census audience size, and determine second differences between the third percentages and the fourth percentages, the second differences associated with the demographic groups, and when at least one of the second differences corresponding to the at least one of the demographic groups satisfies the second threshold, the third means for determining to determine the subscribers, the subset of the subscribers, and the at least one of the demographic groups as useable to determine the audience size of the media network.

Example 33 includes a method comprising accessing, by executing a first instruction with processor circuitry, a first panel audience size corresponding to subscribers of a media provider and a second panel audience size for a subset of the subscribers of the media provider, the subset of the subscribers to access media via media access devices that include return path capabilities, the first panel audience size and the second panel audience size collected by an audience measurement entity, accessing, by executing a first instruction with the processor circuitry, a third panel audience size corresponding to the subscribers of the media provider and a fourth panel audience size corresponding to the subset of the subscribers of the media provider, the third panel audience size and the fourth panel audience size collected by the audience measurement entity, the third panel audience size corresponding to a media network, the fourth panel audience size corresponding to the media network, determine, by executing a first instruction with the processor circuitry, a relative percent absolute difference between the third panel audience size and the fourth panel audience size, when the relative percent difference satisfies a first threshold, determine, by executing a first instruction with the processor circuitry, first percentages of demographic groups corresponding to the first panel audience size and second percentages of the demographic groups corresponding to the second panel audience size, determine, by executing a first instruction with the processor circuitry, differences between the first percentages and the second percentages, the differences associated with the demographic groups, and when at least one of the differences corresponding to at least one of the demographic groups satisfies a second threshold, determining, by executing a first instruction with the processor circuitry, the subscribers, the subset of the subscribers, and the at least one of the demographic groups as useable to determine the audience size of the media network.

Example 34 includes the method of example 33, wherein the media provider is at least one of a cable media provider, a satellite media provider, or a smart television (TV) media provider.

Example 35 includes the method of example 33, wherein the media access devices include at least one of return path data (RPD) devices or automatic content recognition (ACR) enabled devices.

Example 36 includes the method of example 33, wherein the relative percent difference is associated with a daypart.

Example 37 includes the method of example 33, wherein the third panel audience size is a first average panel audience size corresponding to multiple network programs and the fourth panel audience size is a second average panel audience size corresponding to the multiple network programs.

Example 38 includes the method of example 33, wherein the first threshold is eight percent.

Example 39 includes the method of example 33, wherein the second threshold is one percent.

Example 40 includes the method of example 33, further including accessing a first census audience size corresponding to the subscribers of the media provider and a second census audience size corresponding to the subset of the subscribers to the media provider, determine third percentages of the demographic groups represented in the first census audience size and fourth percentages of the demographic groups represented in the second census audience size, determine second differences between the third percentages and the fourth percentages, the second differences associated with the demographic groups, and when at least one of the second differences corresponding to the at least one of the demographic groups satisfies the second threshold, determining the subscribers, the subset of the subscribers, and the one of the demographic groups as useable to determine the audience size of the media network.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A system comprising:
at least one processor; and
at least one memory, having stored thereon program instructions that, upon execution by the at least one processor, cause performance of operations comprising:
  accessing a first panel audience size indicating how many panelist households are subscribers of a media provider in a geographic area and a second panel audience size indicating a first subset of the panelist households that are subscribers of the media provider in the geographic area that have return path capable devices, wherein the first panel audience size and the second panel audience size are collected by an audience measurement entity, and wherein a return path capable device is a device that: accesses media from the media provider and reports tuning data indicative of media presented in a panelist household back to the media provider, or a device that uses fingerprinting to collect tuning data indicative of media presented via the device;
  accessing a third panel audience size indicating a second subset of the panelist households that are subscribers of the media provider in the geographic area that accessed a given media network and a fourth panel audience size indicating a third subset of the panelist households that are subscribes of the media provider in the geographic area that accessed the given media network and have return path capable devices, the third panel audience size and the fourth panel audience size collected by the audience measurement entity;
  determining that a relative percent absolute difference between the third panel audience size and the fourth panel audience size satisfies a first threshold;
  determining that a first percentage of the panelist households that are subscribers of the media provider in the geographic area includes audience members belonging to a given age group;
  determining that a second percentage of the first subset of the panelist households includes audience members belonging to the given age group;

determining that a difference between the first percentage and the second percentage satisfies a second threshold;

based on the determining that the difference between the first percentage and the second percentage satisfies the second threshold, determining weights for respective households of the first subset of the panelist households using the first percentage as a weighting control; and determining an audience estimate for the media network using two or more of the weights.

2. The system of claim 1, wherein the media provider is at least one of a cable media provider, a satellite media provider, or a smart television (TV) media provider.

3. The system of claim 1, wherein the return path capable devices are automatic content recognition (ACR) enabled televisions.

4. The system of claim 1, wherein the relative percent difference is associated with a daypart.

5. The system of claim 1, wherein the first threshold is eight percent.

6. The system of claim 1, wherein the second threshold is one percent.

7. At least one non-transitory machine readable storage medium comprising instructions that, when executed, cause at least one processor to at least:

access a first panel audience size indicating how many panelist households are subscribers of a media provider in a geographic area and a second panel audience size indicating a first subset of the panelist households that are subscribes of the media provider in the geographic area that have return path capable devices, wherein the first panel audience size and the second panel audience size are collected by an audience measurement entity, and wherein a return path capable device is a device that: accesses media from the media provider and reports tuning data indicative of media presented in a panelist household back to the media provider, or a device that uses fingerprinting to collect tuning data indicative of media presented via the device;

access a third panel audience size indicating a second subset of the panelist households that are subscribers of the media provider in the geographic area that accessed a given media network and a fourth panel audience size indicating a third subset of the panelist households that are subscribes of the media provider in the geographic area that accessed the given media network and have return path capable devices, the third panel audience size and the fourth panel audience size collected by the audience measurement entity;

that a relative percent absolute difference between the third panel audience size and the fourth panel audience size satisfies a first threshold;

determine that a first percentage of the panelist households that are subscribes of the media provider in the geographic area includes audience members belonging to a given age group;

determine that a second percentage of the first subset of the panelist households includes audience members belonging to the given age group;

determine that a difference between the first percentage and the second percentage satisfies a second threshold;

based on the determining that difference between the first percentage and the second percentage satisfies the second threshold, determine weights for respective households of the first subset of the panelist households using the first percentage as a weighting control; and determine an audience estimate for the media network using two or more of the weights.

8. The at least one non-transitory machine readable storage medium of claim 7, wherein the media provider is at least one of a cable media provider, a satellite media provider, or a smart television (TV) media provider.

9. The at least one non-transitory machine readable storage medium of claim 7, wherein the return path capable devices are automatic content recognition (ACR) enabled televisions.

10. The at least one non-transitory machine readable storage medium of claim 7, wherein the relative percent difference is associated with a daypart.

11. A method comprising:

accessing a first panel audience size indicating how many panelist households are subscribers of a media provider in a geographic area and a second panel audience size indicating a first subset of the panelist households that are subscribers of the media provider in the geographic area that have return path capable devices, wherein the first panel audience size and the second panel audience size are collected by an audience measurement entity, and wherein a return path capable device is a device that: accesses media from the media provider and reports tuning data indicative of media presented in a panelist household back to the media provider, or a device that uses fingerprinting to collect tuning data indicative of media presented via the device;

accessing a third panel audience size indicating a second subset of the panelist households that are subscribers of the media provider in the geographic area that accessed a given media network and a fourth panel audience size indicating a third subset of the panelist households that are subscribes of the media provider in the geographic area that accessed the given media network and have return path capable devices, the third panel audience size and the fourth panel audience size collected by the audience measurement entity;

determining that a relative percent absolute difference between the third panel audience size and the fourth panel audience size satisfies a first threshold;

determining that a first percentage of the panelist households that are subscribes of the media provider in the geographic area includes audience members belonging to a given age group;

determining that a second percentage of the first subset of the panelist households includes audience members belonging to the given age group;

determining that a difference between the first percentage and the second percentage satisfies a second threshold;

based on the determining that the difference between the first percentage and the second percentage satisfies the second threshold, determining weights for respective households of the first subset of the panelist households using the first percentage as a weighting control; and determining an audience estimate for the media network using two or more of the weights.

\* \* \* \* \*